(12) United States Patent
Yamamoto

(10) Patent No.: US 7,529,033 B2
(45) Date of Patent: May 5, 2009

(54) PROJECTION LENS DEVICE AND PROJECTION DISPLAY APPARATUS USING THE SAME

(75) Inventor: Chikara Yamamoto, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 12/122,203

(22) Filed: May 16, 2008

(65) Prior Publication Data

US 2008/0291542 A1 Nov. 27, 2008

(30) Foreign Application Priority Data

May 21, 2007 (JP) ............................ P2007-134538

(51) Int. Cl.
*G02B 3/00* (2006.01)
*G02B 9/00* (2006.01)

(52) U.S. Cl. ...................... 359/649; 359/651; 359/754

(58) Field of Classification Search ......... 359/649–651, 359/663, 754
See application file for complete search history.

(56) References Cited

U.S. PATENT DOCUMENTS

| 6,624,952 | B2 | 9/2003 | Kuwa et al. |
| 6,947,222 | B2 | 9/2005 | Komatsu et al. |
| 7,123,426 | B2 | 10/2006 | Lu et al. |
| 7,126,767 | B2 | 10/2006 | Lu et al. |
| 7,230,770 | B2 * | 6/2007 | Kreitzer et al. .............. 359/649 |
| 7,310,188 | B2 * | 12/2007 | Yamamoto et al. ......... 359/651 |

FOREIGN PATENT DOCUMENTS

| JP | 2003-15033 A | 1/2003 |
| JP | 2004-326079 A | 11/2004 |

\* cited by examiner

*Primary Examiner*—Scott J Sugarman
(74) *Attorney, Agent, or Firm*—Birch, Stewart, Kolasch & Birch, LLP

(57) ABSTRACT

A projection lens device includes, in order from a magnification side, a first lens group $G_1$ having a negative refractive power, and a second lens group $G_2$ having a positive refractive power. The projection lens device is substantially telecentric on a reduction side thereof. The second lens group $G_2$ includes a three-element cemented lens $L_{10}$ to $L_{12}$ formed by cementing three lens elements. A space between the first lens group $G_1$ and the second lens group $G_2$ is set as the maximum inter-lens space (the maximum air space) so that a reflection mirror 4 can be inserted. Also, the projection lens device satisfies eight conditional expressions.

10 Claims, 22 Drawing Sheets

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

EXAMPLE 10

EXAMPLE 11

EXAMPLE 12

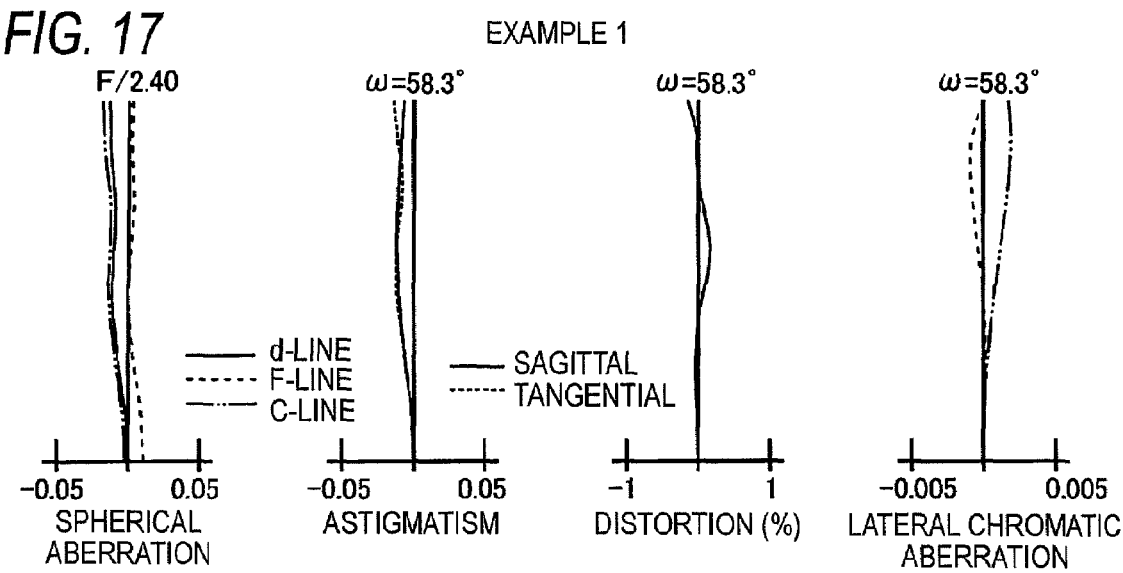
FIG. 17 EXAMPLE 1
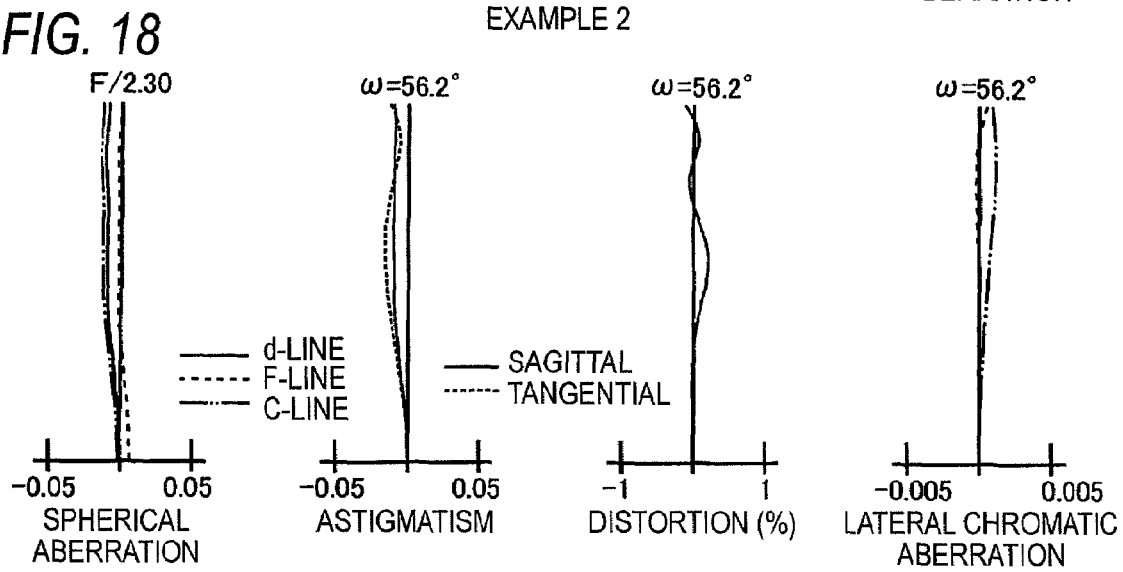
FIG. 18 EXAMPLE 2
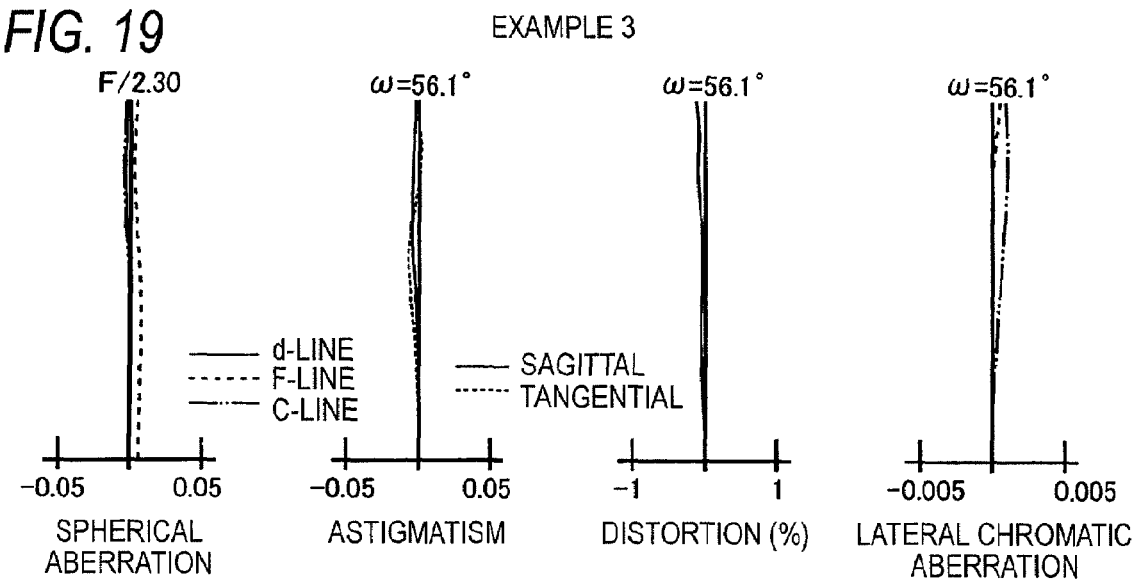
FIG. 19 EXAMPLE 3

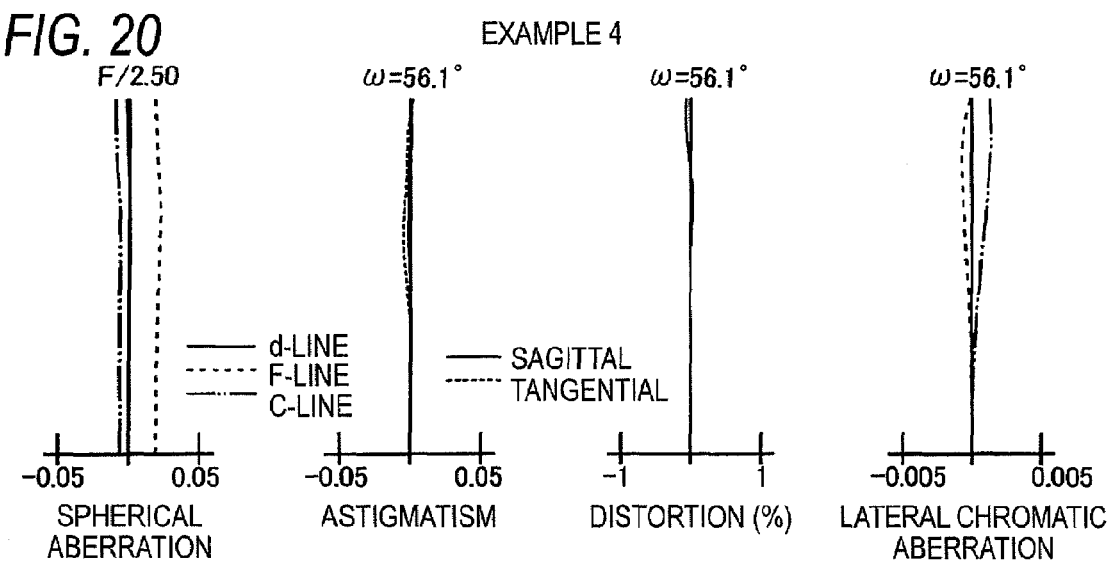
FIG. 20 EXAMPLE 4
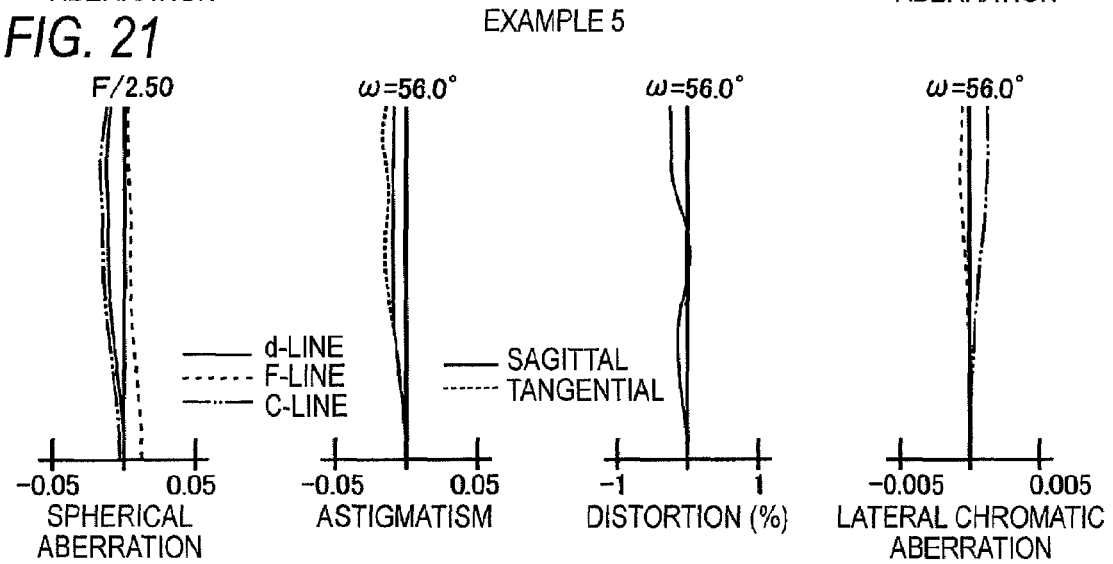
FIG. 21 EXAMPLE 5
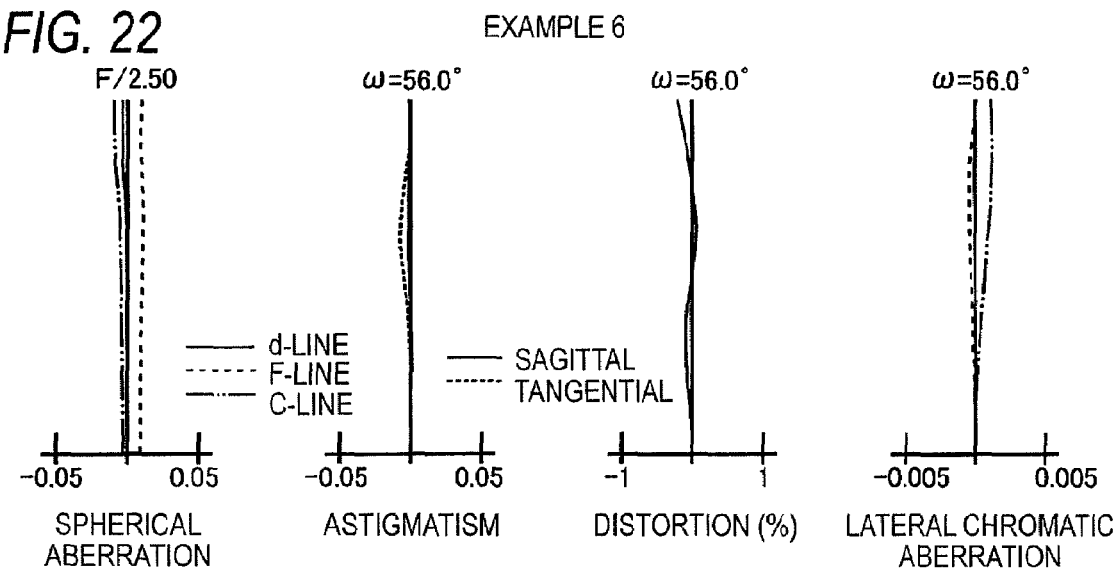
FIG. 22 EXAMPLE 6

EXAMPLE 7

EXAMPLE 8

EXAMPLE 9

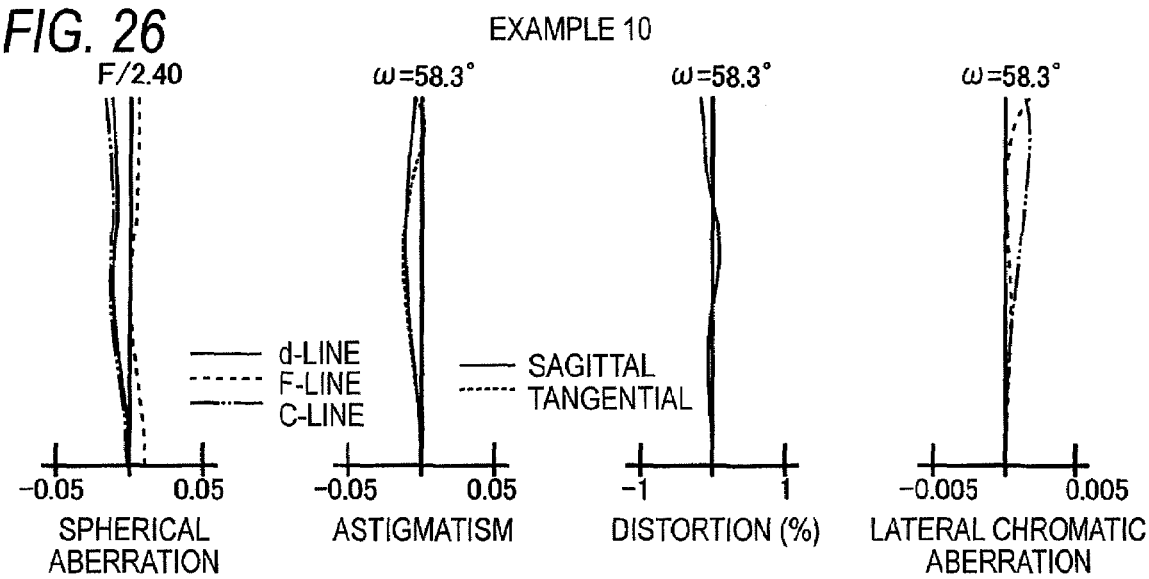
FIG. 26 EXAMPLE 10
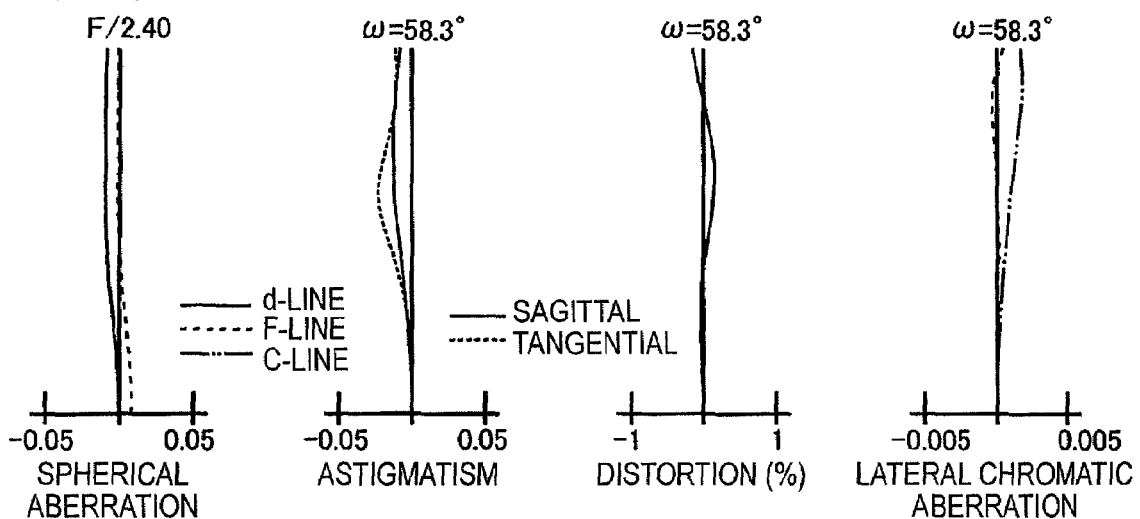
FIG. 27 EXAMPLE 11
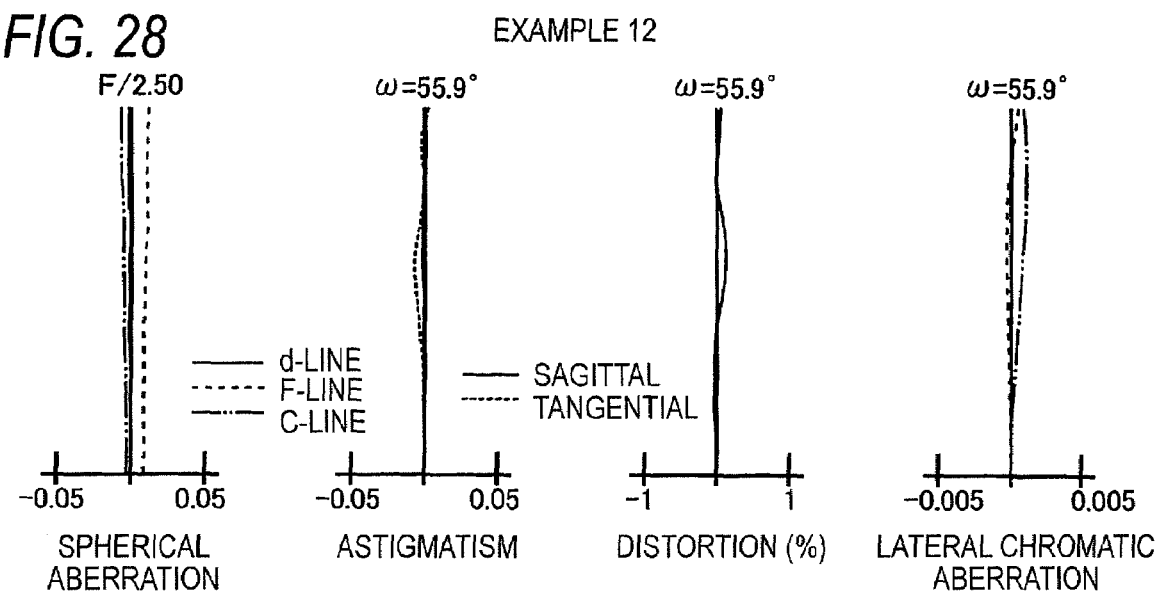
FIG. 28 EXAMPLE 12

PROJECTION LENS DEVICE AND PROJECTION DISPLAY APPARATUS USING THE SAME

CROSS-REFERENCE TO RELATED APPLICATIONS

This application is based upon and claims the benefit of priority from the Japanese Patent Application No.2007-134538 filed on May 21, 2007; the entire contents of which are incorporated herein by reference.

BACKGROUND OF THE INVENTION

1. Technical Field

The invention relates to a projection lens device for magnifying and projecting display information and the like from a light valve such as a transmissive or reflective liquid crystal display device or a DMD (a digital micro mirror device), and in particular, relates to a projection lens device suitable for a rear projection display apparatus such as rear projection televisions, and a projection display apparatus using the projection lens device.

2. Description of the Related Art

Known projection display apparatuses include (i) a front projection display apparatus in which a projection lens device is arranged on the same side as a viewer, the front projection display apparatus that forms an image of light beams exiting from the projection lens device on a reflective display screen, and (ii) a rear projection display apparatus in which a projection lens device is arranged across a display screen from a viewer, the rear projection display apparatus that forms an image of light beams exiting from the projection lens device on the transmissive display screen.

As to the rear projection display apparatus, the following configuration is known like, for example, a rear projection television. That is, various components from a light source to a screen are housed in a cabinet, and light beams containing image information from a projection lens device disposed on a rear side thereof are projected toward the screen disposed in front of the cabinet.

Recently, various projection lens devices for use in the cabinet-type projection display apparatus have been proposed.

A projection lens device is demanded to allow for projection of a large-size image with a short projection distance. Particularly, a projection lens device for the rear projection is demanded to achieve a wider angle of view because a decrease in thickness of the display apparatus is strongly demanded.

Also, a large back focal length is demanded in order to provide a synthesizing section for synthesizing light beams from respective light valves in an optical system that uses the plurality of light valves for colorization, to separate illumination light beams and projection light beams, and to solve problems caused by heat.

In response to these demands, lenses having a relatively-long back focal length and an angle of view, on a magnification side, of 100 degrees or more have been described in JP 2003-15033 A (corresponding to U.S. Pat. No. 6,624,952), JP 2004-326079 A (U.S. Pat. Nos. 6,947,222), 7,123,426, and 7,126,767.

In a projection display apparatus, particularly in a rear projection type device, for the purpose of deflecting an optical path in a predetermined position in order to downsize the display apparatus, it is considered that inserting a reflective element into the projection lens device is advantageous.

However, U.S. Pat. Nos. 7,123,426, and 7,126,767 fail to have a concept of inserting a reflective element into an optical path. Also, in order to compensate for a narrow space, JP 2003-15033 A and JP 2004-326079 A uses a prism for lengthening an optical path, in stead of a reflection mirror, as a reflective element inserted into the optical path, which increases a manufacturing cost.

SUMMARY OF THE INVENTION

The invention has been made in consideration of the above circumstances and provides a projection lens device securing a long back focal length, having a wide angle of view, having high projection performance, being capable of employing an inexpensive reflection mirror as a reflective element for deflecting an optical path in order to achieve miniaturization, and being capable of well correcting various aberrations. Also, the invention provides a projection display apparatus using the projection lens device.

According to an aspect of the invention, a projection lens device includes, in order from a magnification side, a first lens group and a second lens group. The first lens group has a negative refractive power. The second lens group has a positive refractive power. A space between the first lens group and the second lens group is set as the maximum air space in the projection lens device. The projection lens device is substantially telecentric on a reduction side thereof. The first lens group has at least one aspheric surface. The projection lens device satisfies the following conditional expressions (1) to (5)

$$5.0 < Bf/f \tag{1}$$

$$105° < 2\omega \tag{2}$$

$$5.0 < d/f \tag{3}$$

$$-15.0 < f1/f < -1.0 \tag{4}$$

$$5.7 < f2/f \tag{5},$$

where
f denotes a focal length of the whole system,
Bf denotes an air equivalent length of a back focal length of the whole system,
2ω denotes a field angle on the magnification side,
d denotes the maximum air space,
f1 denotes a focal length of the first lens group, and
f2 denotes a focal length of the second lens group.

Also, it is preferable that a three-element cemented lens formed by cementing three lenses is disposed in the second lens group, and that two or more positive lenses made of a material having an Abbe number of 75 or more are disposed in the second lens group.

Also, it is preferable that in one of the maximum air space and air spaces in the second lens group, a magnification-side focal point of a lens group disposed on the reduction side of the one air space exists, and that a lens surface adjacent to the reduction side of the magnification-side focal point is formed into a concave surface.

Also, in the above projection lens device, it is preferable that at least one positive lens that satisfies the following conditional expressions (6) and (7) is disposed in the first lens group:

$$2.5 < fp/f < 25.0 \tag{6}$$

$$45 > vdp \tag{7},$$

where fp denotes a focal length of the positive lens in the first lens group, and vdp denotes an Abbe number of the positive lens in the first lens group.

Also, in the above projection lens device, it is preferable that an optical path of the system is deflected by inserting a reflection mirror in an air space that satisfies the following conditional expression (8):

$$6.0 < ld/f \qquad (8),$$

where ld denotes the air space in which the reflection mirror is disposed.

Also, it is preferable that at least one aspheric surface is disposed in the second lens group.

Also, it is preferable that a three-element cemented lens that is formed by sandwiching a positive lens between two negative lenses is disposed in the first lens group.

Also, it is preferable that a lens, on the most-magnification side, of the first lens group and an optional lens of the second lens group are aspheric lenses, and that correction of an image surface curvature associated with variation in projection distance is performed by moving the lens, on the most-magnification side, of the first lens group in an optical axis direction.

Also, it is preferable that correction of a position of an image place associated with variation in projection distance is performed by varying the air space between the first lens group and the second lens.

According to another aspect of the invention, a projection display apparatus includes at least one light source, at least one light valve, at least one illumination optical section and the above projection lens device. The at least one illumination optical section guides a beam emitted from the at least light source, to the at least one light valve. The beam emitted from the at least one light source is optically modulated by the at least one light valve and is projected onto a screen by the projection lens device.

Since the projection lens device according to the invention has the above configuration, the projection lens device can secure a long back focal length and have a wide angle of view and high projection performance. Also, when a reflective element for deflecting an optical path is used in order to achieve miniaturization, it is possible to use an inexpensive reflection mirror as the reflective element, which can decrease manufacturing cost.

Furthermore, the projection display apparatus according to the invention can be configured to secure a long back focal length, have a wide angle of view and high projection performance, and decrease manufacturing cost.

BRIEF DESCRIPTION OF THE DRAWINGS

FIG. 17 is a diagram illustrating various aberrations of the projection lens device according to Example 1.

FIG. 18 is a diagram illustrating various aberrations of the projection lens device according to Example 2.

FIG. 19 is a diagram illustrating various aberrations of the projection lens device according to Example 3.

FIG. 20 is a diagram illustrating various aberrations of the projection lens device according to Example 4.

FIG. 21 is a diagram illustrating various aberrations of the projection lens device according to Example 5.

FIG. 22 is a diagram illustrating various aberrations of the projection lens device according to Example 6.

FIG. 26 is a diagram illustrating various aberrations of the projection lens device according to Example 10.

FIG. 27 is a diagram illustrating various aberrations of the projection lens device according to Example 11.

FIG. 28 is a diagram illustrating various aberrations of the projection lens device according to Example 12.

DETAILED DESCRIPTION OF EMBODIMENTS OF THE INVENTION

Figure 1:
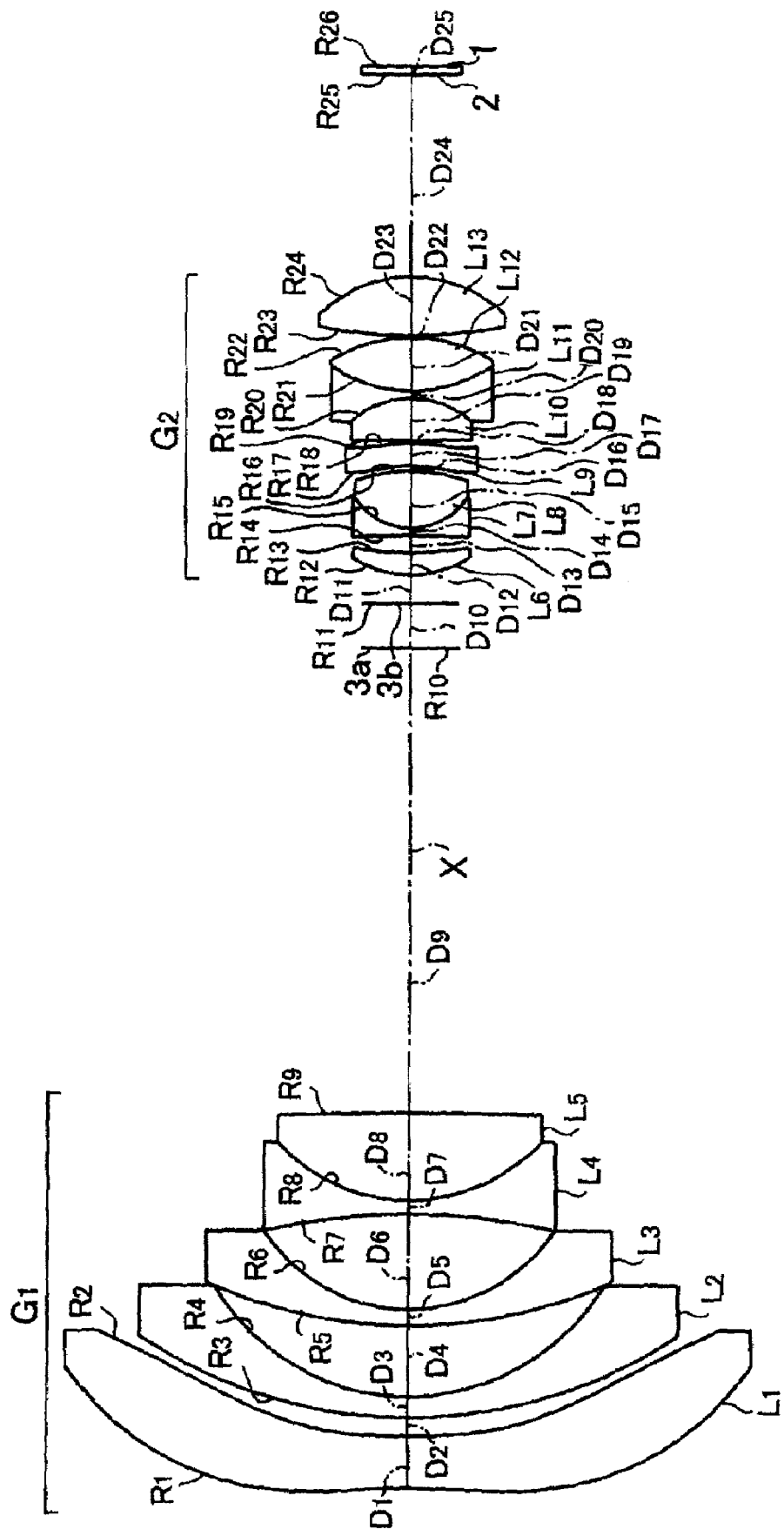
FIG. 1 is a diagram illustrating the configuration of a projection lens device according to Example 1 of the invention.

Hereinafter, embodiments of the invention will be described with reference to the drawings. FIG. 1 illustrates a projection lens device according to an embodiment of the invention, and is a diagram illustrating the configuration of a lens device of Example 1 which will be described later. This lens device will be described below as a representative lens device of this embodiment. Also, X in the drawings represents an optical axis.

The projection lens device of this embodiment includes, in order from a magnification side, a first lens group $G_1$ having a negative refractive power, a mask $3a$ and an aperture diaphragm $3b$ (the mask $3a$ and the aperture diaphragm $3b$ are replaceable with each other), and a second lens group $G_2$ having a positive refractive power. The projection lens device is substantially telecentric on a reduction side thereof. In the second lens group $G_2$, a three-element cemented lens $L_{10}$ to $L_{12}$ formed by cementing three lenses is disposed. A space between the first lens group $G_1$ and the second lens group $G_2$ is set as the maximum inter-lens space (the maximum air space).

The three-element cemented lens $L_{10}$ to $L_{12}$ is formed by sandwiching an eleventh lens $L_{11}$ formed of a negative lens between a tenth lens $L_{10}$ and a twelfth lens $L_{12}$, which are formed of positive lenses.

Also, in the first lens group $G_1$, a two-element cemented lens $L_4$ and $L_5$ formed by cementing two lenses is disposed on the most-reduction side.

The projection lens device shown in FIG. 1 is configured so that light beams emitted from a right side of the paper of FIG. 1 and containing image information displayed on an image display surface 1 of a light valve are incident on the projection lens device through a cover glass 2, and are projected to a left side thereof to magnify the image. In FIG. 1, only one image display surface 1 is illustrated for convenience of explanation. However, in some projection display apparatus, light beams emitted from a light source are separated by using a color separation optical system, and three light valves for three primary color light beams are provided so that the device can display a full-color image. By disposing a color synthesizing unit such as a cross dichroic prism (which may be a glass block as described in some examples) in a position of the cover glass 2, it is possible to synthesize the three primary color light beams.

Figure 2:
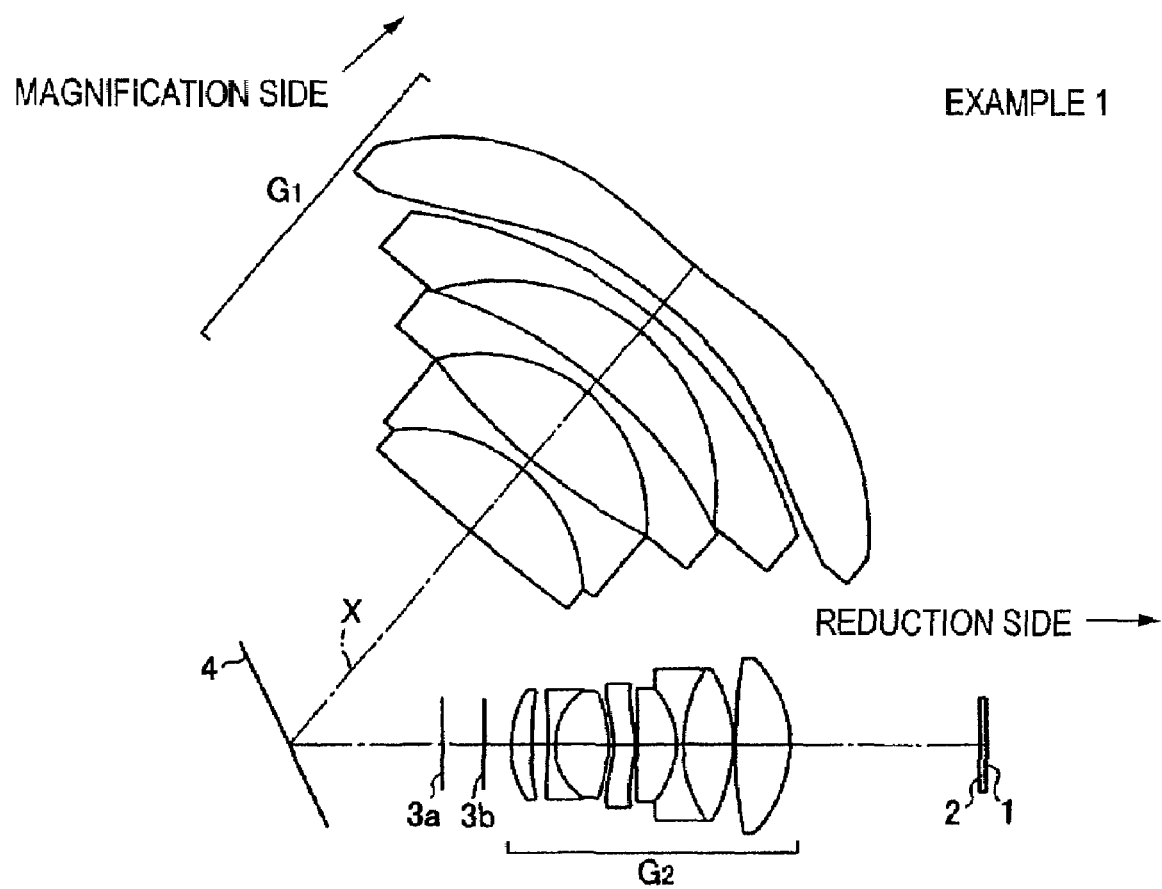
FIG. 2 is a diagram illustrating the configuration in which a reflection mirror for deflecting an optical path is disposed in the projection lens device shown in FIG. 1.

FIG. 2 illustrates such a configuration that a reflection mirror 4 serving as a plate-shape optical-path deflecting unit for deflecting an optical path is disposed between the first lens group $G_1$ and the second lens group $G_2$ of the projection lens device shown in FIG. 1.

Also, the projection lens device of this embodiment is configured to have the maximum air space between the first lens group $G_1$ and the second lens group $G_2$, and satisfies the following conditional expressions (1) to (8) (it is noted that the conditional expression (8) is satisfied only in Examples 1 and 3 to 5):

$$5.0 < Bf/f \quad (1)$$

$$105° < 2\omega \quad (2)$$

$$5.0 < d/f \quad (3)$$

$$-15.0 < f1/f < -1.0 \quad (4)$$

$$5.7 < f2/f \quad (5)$$

$$2.5 < fp/f < 25.0 \quad (6)$$

$$45 > vdp \quad (7)$$

$$6.0 < ld/f \quad (8)$$

where
f denotes a focal length of the whole system,
Bf denotes an air equivalent length of a back focal length of the whole system,
$2\omega$ denotes a field angle on the magnification side,
d denotes the maximum air space,
f1 denotes a focal length of the first lens group, and
f2 denotes a focal length of the second lens group.
fp denotes a focal length of the positive lens in the first lens group $G_1$,
vdp denotes an Abbe number of the positive lens in the first lens group $G_1$, and
ld denotes an air space in which the reflection mirror 4 is disposed.

Since the projection lens device of this embodiment is configured as above, it can secure a long back focal length and have a wide angle of view and high projection performance. Also, it is possible to employ an inexpensive reflection mirror as a reflective element. Furthermore, it is possible to well correct various aberrations, particularly, chromatic aberration by satisfying the conditional expressions (6) and (7). The respective components are set to correlate with each other. Thus, it is possible to obtain these effects by satisfying the all conditions mentioned above. Hereinafter, significance of the respective conditional expressions (1) to (8) will be described.

The conditional expression (1) represents a lower limit of the back focal length Bf with respect to the focal length f of the whole system. If Bf/f falls below this lower limit, it becomes difficult to secure the required back focal length Bf.

The projection lens device may be configured to satisfy the following conditional expression (1') instead of the conditional expression (1). In such a case, it is possible to further surely secure the required back focal length.

$$6.5 < Bf/f \quad (1')$$

The conditional expression (2) represents a lower limit of an angle of view on the magnification side. If $2\omega$ falls below this lower limit, it becomes difficult to insert the reflection mirror for deflecting the optical path or and the lens back becomes too short.

The conditional expression (3) defines a lower limit of a ratio of the focal length f of the whole system to the maximum air space d. If d/f falls below this lower limit, it becomes difficult to insert the reflection mirror for deflecting the optical path and the lens back becomes too short.

The conditional expression (4) defines an allowable range of a ratio of the focal length f of the whole system to the focal length f1 of the first lens group $G_1$. If f1/f exceeds the upper limit, it becomes difficult to correct aberrations. Conversely, if f1/f falls below the lower limit, an increase in size of the projection lens device is caused or a decrease in length of the lens back is caused.

The conditional expression (5) represents a lower limit of a ratio of the focal length f of the whole system to the focal length f2 of the second lens group $G_2$. If f2/f falls below this lower limit, it becomes difficult to insert the reflection mirror for deflecting the optical path, and the lens back becomes too short.

Also, the projection lens device may be configured to satisfy the following conditional expression (5') instead of the conditional expression (5). In such a case, it is possible to surely insert the reflection mirror for deflecting the optical path between the lenses and surely secure the required lens back.

$$7.0 < f2/f \quad (5')$$

The conditional expression (6) defines an allowable range of a ratio of the focal length f of the whole system to the focal length fp of the positive lens of the first lens group $G_1$. If fp/f is out of this range, it becomes difficult to correct chromatic aberration.

The conditional expression (7) defines a lower limit of the Abbe number vdp of the positive lens of the first lens group $G_1$. If vdp falls below this lower limit, it becomes difficult to correct chromatic aberration.

The conditional expression (8) defines a lower limit of a ratio of the focal length f of the whole system to the air space ld in a position where the reflection mirror for deflecting the optical path is disposed. If ld/f falls below this lower limit, it becomes difficult to insert the reflection mirror for deflecting the optical path between lenses.

Also, in the projection lens device of this embodiment, the three-element cemented lens is disposed in the first lens group $G_1$ and/or the second lens group $G_2$. With this configuration, it is possible to well correct chromatic aberration (particularly, higher-order chromatic aberration) and to miniaturize the whole system. Particularly, by providing the three-element cemented lens formed of positive, negative, and positive lenses in the second lens group $G_2$ and providing the three-element cemented lens formed of negative, positive, and negative lenses in the first lens group $G_1$, it is possible to well reduce the second order chromatic aberration.

Also, in the projection lens device of this embodiment, two or more positive lenses made of a material having an Abbe number of 75 or more are disposed in the second lens group $G_2$, and the three-element cemented lens is disposed in the second lens group $G_2$ as described above. Thus, it is possible to well correct chromatic aberration. It is more preferable that three ore more positive lenses made of a material having an Abbe number of 75 or more are provided because it is possible to further well correct chromatic aberration.

The projection lens device of this embodiment is configured so that in one of the maximum air space and air spaces in the second lens group $G_2$, a magnification-side focal point of a lens group disposed on the reduction side of the one air space exists, and that a lens surface adjacent to the reduction side of the magnification-side focal point is formed into a concave surface. With this configuration, it is possible to improve resolution power while securing the lens back and to achieve miniaturization.

In the projection lens device of this embodiment, at least one aspheric surface is disposed in each of the first lens group $G_1$ and the second lens group $G_2$. With this configuration, it is possible to improve resolution power while reducing the number of lenses.

Furthermore, the projection lens device of this embodiment is configured so that a lens, on the most magnification side, of the first lens group $G_1$ and an optional lens of the second lens group $G_2$ are formed of aspheric lenses, and that correction of an image surface curvature associated with variation in projection distance is performed by moving the lens, on the most-magnification side, of the first lens group $G_1$ in an optical axis direction. In addition, correction of a position of an image place associated with variation in projection distance is performed by varying the air space between the first lens group $G_1$ and the second lens $G_2$.

Figure 29:
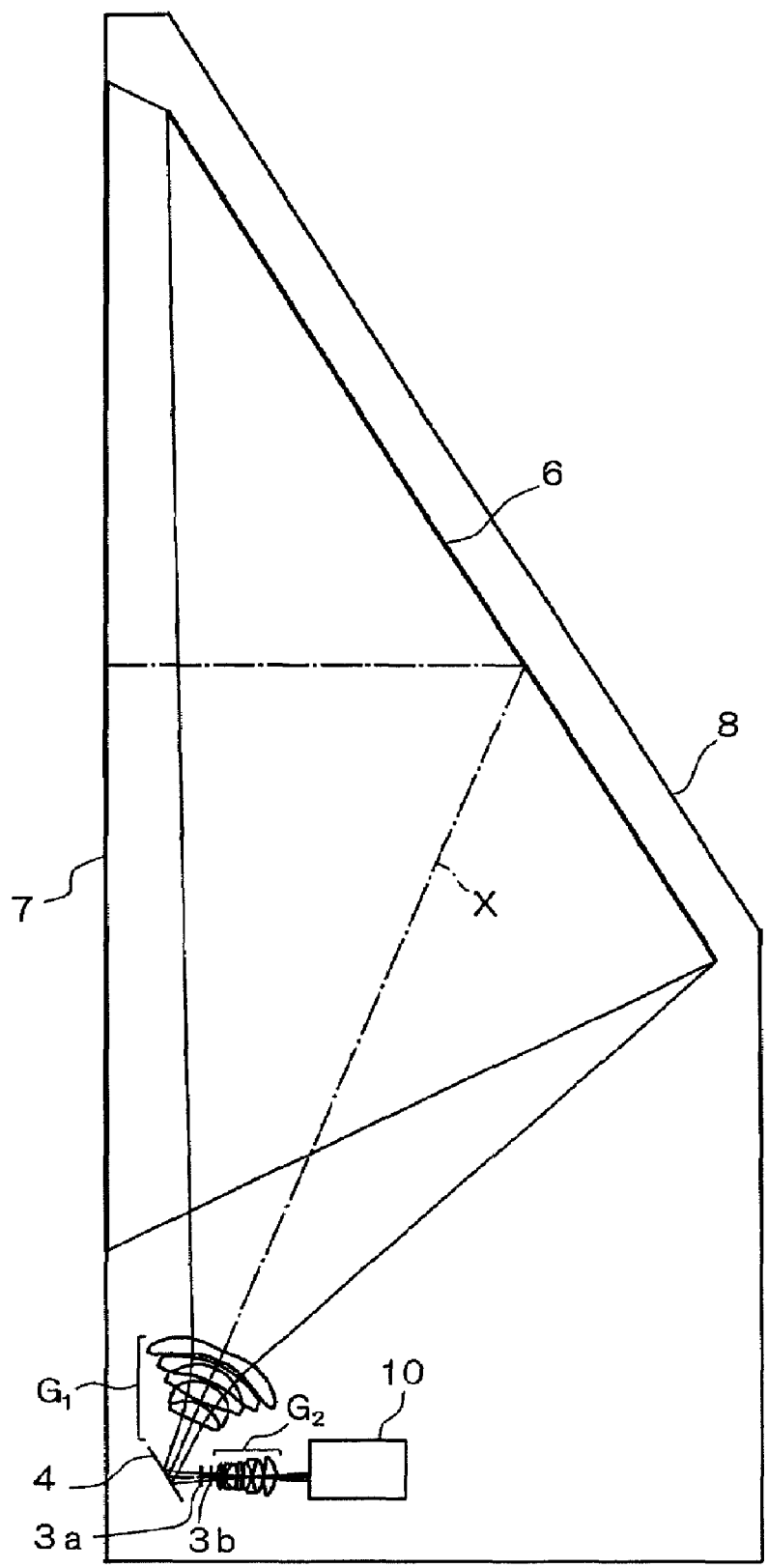
FIG. 29 is a diagram illustrating the schematic configuration of a projection display apparatus according to the invention.
Figure 30:
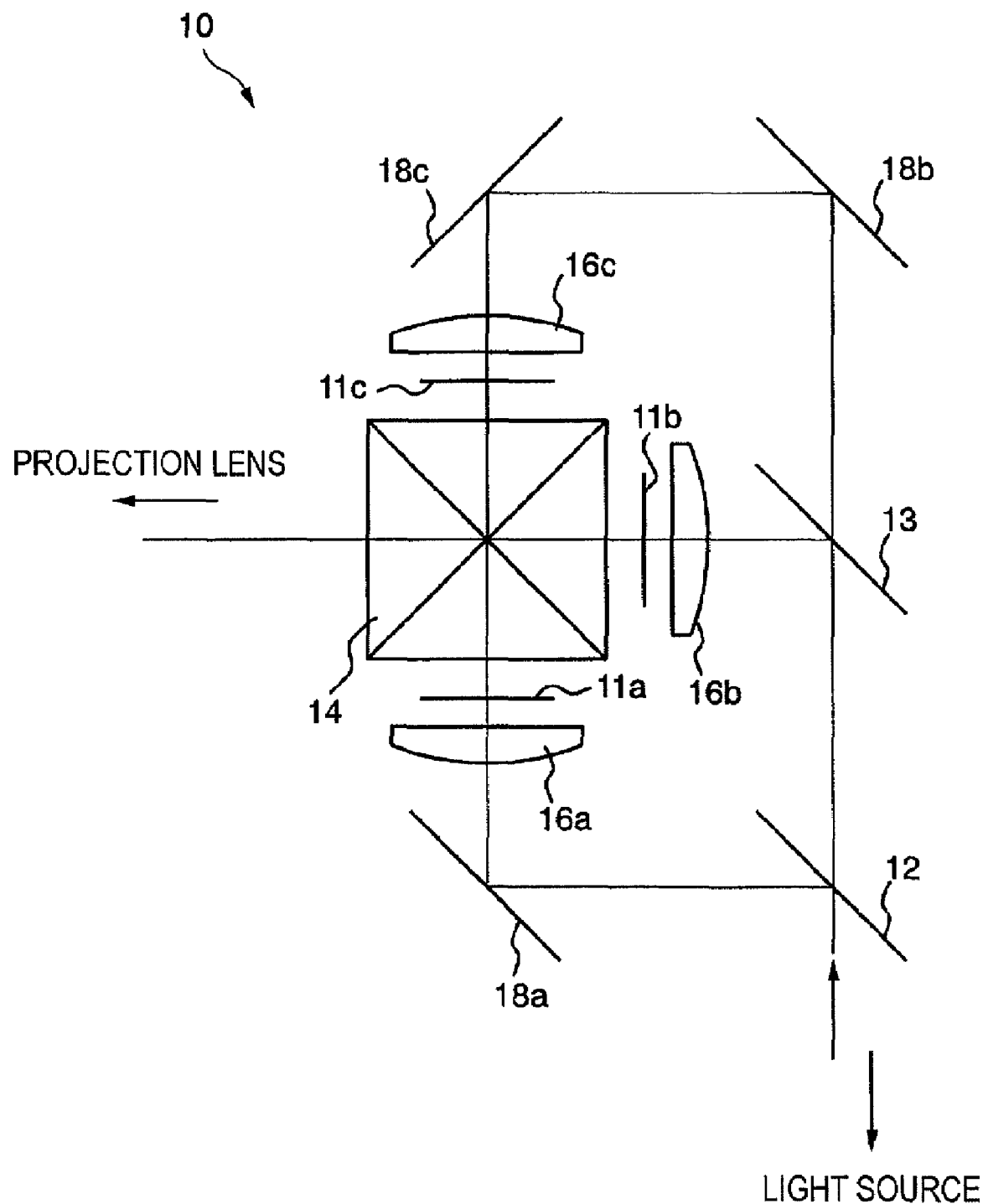
FIG. 30 is a diagram illustrating the configuration of an illumination optical system of the projection display apparatus.

Next, an embodiment of a projection display apparatus according to the invention will be described. FIG. 29 is a vertical sectional diagram illustrating the projection display apparatus according to the embodiment of the invention. FIG. 30 is a diagram illustrating an exemplary configuration of the illumination optical system 10 shown in FIG. 29.

The projection display apparatus shown in FIG. 29 is a rear projection display apparatus that is particularly suitable to provide the effect of the projection lens device mentioned above. In the projection display apparatus, a cabinet 8 contains a light source, a light valve, an illumination optical section that guides light beams emitted from the light source to the light valve (which are included in an illumination optical system 10 shown in the drawing), and the projection lens device described above. In this projection display apparatus, the light beams emitted from the light source are optically modulated by the light valve and the light beams containing image information are projected onto a rear surface of a screen 7, which is disposed at a predetermined distance, by the projection lens device and the rear side mirror 6. The viewer sees, from the surface side of the screen 7 (a left side of the drawing), the magnified image projected onto the screen 7.

As shown in FIG. 30, the illumination optical system 10 includes transmissive liquid crystal panels 11a to 11c as the light valves, dichroic mirrors 12 and 13 for color separation, a cross dichroic prism 14 for color synthesis, condenser lenses 16a to 16c, and total reflection mirrors 18a to 18c. Although the previous stage of the dichroic mirror 12 is not shown in the drawings, white light beams exiting from the light source are incident through the illumination optical section on the liquid crystal panel 11a to 11c that correspond to three color light beams (a G light, a B light, and an R light), respectively, and are optically modulated. Then, the modulated light beams are projected on the screen 7 by the projection lens device show in FIG. 29.

The projection display apparatus employs the projection lens device according to the invention. Thus, it is possible to obtain a large screen which has high resolution and in which chromatic aberration is well corrected. Also, in the projection display apparatus, the reflection mirror 4 for deflecting the optical path is disposed between the first lens group $G_1$ and the second lens group $G_2$ of the projection lens device, and the optical path is deflected at an acute angle. Thus, the projection display apparatus can be decreased in height and in thickness. In addition, the projection display apparatus employs the reflection mirror 4 as an element for deflecting an optical path. Thus, this configuration is advantageous in cost, as compared with the case where a prism is used to deflect an optical path. Also, in the projection display apparatus, instead of the prism capable of shortening the physical optical path, the reflection mirror 4 having a plate shape is used because it is possible to greatly increase a spatial distance between the first lens group $G_1$ and the second lens group $G_2$, or a distance between lenses in the respective lens groups $G_1$ and $G_2$.

Hereinafter, detailed examples of the projection lens device according to the invention will be described. Also, in the respective examples, members having the similar effect will be referenced by the same reference numerals and signs.

EXAMPLE 1

As shown in FIG. 1, the projection lens device according to Example 1 includes, in order from a magnification side, a first lens group $G_1$ having a negative refractive power, a mask 3a and an aperture diaphragm 3b, and a second lens group $G_2$ having a positive refractive power. The projection lens device is substantially telecentric on a reduction side thereof. Also, FIG. 2 illustrates the configuration in which a reflection mirror 4 serving as an optical-path deflecting unit that deflects an optical path is disposed between the first lens group $G_1$ and the second lens group $G_2$ in the projection lens device shown in FIG. 1.

The first lens group $G_1$ includes, in order from the magnification side, a first lens $L_1$ formed of an aspheric lens having a low refractive power, second and third lenses $L_2$, $L_3$ formed of negative meniscus lenses having concave surfaces directed to the reduction side, and a two-element cemented lens formed by cementing a fourth lens $L_4$ formed of a biconcave lens and a fifth lens $L_5$ formed of a biconvex lens.

Also, the second lens group $G_2$ includes, in order from the magnification side, a sixth lens $L_6$ formed of a positive meniscus lens having a convex surface directed to the magnification side, a two-element cemented lens formed by cementing a seventh lens $L_7$ formed of a biconcave lens and an eighth lens $L_8$ formed of a biconvex lens, a ninth lens $L_9$ formed of an aspheric lens having a convex surface directed to the reduction side, a three-element cemented lens formed by sandwiching an eleventh lens $L_{11}$ formed of a biconcave lens between a tenth lens $L_{10}$ and a twelfth lens $L_{12}$ formed of positive lenses, and a thirteenth lens $L_{13}$ formed of a biconvex lens.

Shapes of the respective aspheric surfaces are determined by the following aspheric surface expression. In the first lens $L_1$ and the ninth lens $L_9$ having the aspheric surfaces, it is possible to obtain effect even if any one surface of each lens is formed into an aspheric surface, but it is more preferable that both surfaces of each lens is formed into an aspheric surface.

Aspheric Surface Expression $$Z = \frac{\frac{Y^2}{R}}{1 + \sqrt{1 - \frac{K \times Y^2}{R^2}}} + \sum_{i=3}^{12} A_i Y^i$$

where

Z denotes a length of a perpendicular from a point on an aspheric surface, which is apart from the optical axis at a distance Y, to a tangential plane (a plane perpendicular to the optical axis) of a vertex of the aspheric surface, Y denotes a distance from the optical axis, R denotes a radius of curvature in the vicinity of the optical axis of the aspheric surface, K denotes an eccentricity, and $A_i$ denotes an aspheric surface coefficient (i=3 to 12).

The projection lens device according to Example 1 is configured to satisfy the conditional expressions (1) to (8). Furthermore, as to the conditional expressions (1) and (5), particularly, the projection lens device is configured to satisfy the conditional expressions (1') and (5') in which a more preferable lower limit is given.

In FIG. 1, an image display surface 1 and a cover glass 2 of a light valve are shown. The projection lens device according to Example 1 includes an air space, in which the reflection mirror 4 for deflecting the optical path can be disposed, between the first lens group $G_1$ and the second lens group $G_2$. The reflection mirror 4 can be disposed as shown in FIG. 2. Also, the projection lens device is configured to be telecentric on the reduction side.

The upper portion of Table 1 shows: R which is a radius of curvature of each lens surface in the projection lens device according to the Example 1 (R is normalized with a focal length=1: that is the same in the following examples); D (may be referred to as 'on-axis surface space') which is center thicknesses of the lenses and air spaces between the lenses (D is normalized with a focal length=1: that is the same in the following examples); $N_d$ which is a refractive index of each lens at a d-line; and $v_d$ which is an Abbe number of each lens at the d-line. In the Table 1 and the following tables, respective surface numbers represent an order of the surfaces from the magnification side. Each surface having '*' sign on a right side of its surface number is formed into an aspheric surface. In the Example 1 and the following Examples 2 to 12, each radius of curvature R of the aspheric surfaces is represented by a radius of curvature R on the optical axis X. However, in the configuration diagram of the projection lens device, some explanatory lines are not drawn from the intersection points between the lenses and the optical axis X, for simplicity of the drawings.

Also, the lower portion of Table 1 show constants K and $A_3$ to $A_{12}$ corresponding to the respective aspheric surfaces. The lowest portion of Table 1 shows a projection distance (a space from a conjugated position on the magnification side to the first surface of the lens device).

TABLE 1

| surface | R | D | Nd | vd |
|---|---|---|---|---|
| 1* | −17.3977 | 1.7050 | 1.49100 | 57.6 |
| 2* | 40.5771 | 0.6089 | | |
| 3 | 16.0808 | 0.6820 | 1.71300 | 53.9 |
| 4 | 7.5466 | 2.3112 | | |
| 5 | 16.4546 | 0.5359 | 1.71300 | 53.9 |
| 6 | 5.8436 | 3.0933 | | |
| 7 | −21.5908 | 0.4384 | 1.77250 | 49.6 |
| 8 | 6.0353 | 2.8673 | 1.58144 | 40.7 |
| 9 | −123.8353 | 15.2909 | | |
| 10 (mask) | ∞ | 1.4614 | | |
| 11 (ad) | ∞ | 0.9576 | | |
| 12 | 3.6391 | 0.7324 | 1.84666 | 23.8 |
| 13 | 11.6845 | 0.5650 | | |
| 14 | −34.7420 | 0.2436 | 1.80400 | 46.6 |
| 15 | 2.2889 | 1.8682 | 1.49700 | 81.6 |
| 16 | −5.3871 | 0.1703 | | |
| 17* | −4.7244 | 0.7306 | 1.51007 | 56.2 |
| 18* | −5.9760 | 0.0928 | | |
| 19 | 1740.9289 | 1.3730 | 1.48749 | 70.2 |
| 20 | −3.0446 | 0.2436 | 1.80610 | 33.3 |
| 21 | 4.7709 | 1.7480 | 1.49700 | 81.6 |
| 22 | −5.3534 | 0.0731 | | |
| 23 | 16.1190 | 1.9450 | 1.49700 | 81.6 |

TABLE 1-continued

| | | | | |
|---|---|---|---|---|
| 24 | −4.4593 | 6.5897 | | |
| 25 | ∞ | 0.2558 | 1.51680 | 64.2 |
| 26 | ∞ | | | | aspheric surface coefficient

| surface | K | $A_3$ | $A_4$ | $A_5$ | $A_6$ |
|---|---|---|---|---|---|
| 1 | 0.8000 | $8.2863 \times 10^{-4}$ | $2.3512 \times 10^{-3}$ | $-2.0399 \times 10^{-4}$ | $-5.4961 \times 10^{-5}$ |
| 2 | −2.7978 | $1.3856 \times 10^{-3}$ | $1.8230 \times 10^{-3}$ | $-2.9573 \times 10^{-4}$ | $1.5940 \times 10^{-5}$ |
| 17 | 1.0000 | 0.0000 | $1.1539 \times 10^{-2}$ | $-3.9525 \times 10^{-3}$ | $2.5277 \times 10^{-3}$ |
| 18 | 1.0000 | 0.0000 | $1.0175 \times 10^{-2}$ | $-3.3576 \times 10^{-4}$ | $1.6595 \times 10^{-3}$ |

| surface | $A_7$ | $A_8$ | $A_9$ | $A_{10}$ | $A_{11}$ | $A_{12}$ |
|---|---|---|---|---|---|---|
| 1 | $1.2158 \times 10^{-5}$ | $-6.1068 \times 10^{-7}$ | $-4.0457 \times 10^{-8}$ | $4.4062 \times 10^{-9}$ | $-2.7728 \times 10^{-11}$ | $-4.7533 \times 10^{-12}$ |
| 2 | $3.2056 \times 10^{-8}$ | $-4.5558 \times 10^{-7}$ | $6.3425 \times 10^{-8}$ | $2.1559 \times 10^{-9}$ | $-7.6175 \times 10^{-10}$ | $3.2610 \times 10^{-11}$ |
| 17 | $5.4562 \times 10^{-4}$ | $-6.0454 \times 10^{-4}$ | $2.3535 \times 10^{-4}$ | $-3.5351 \times 10^{-5}$ | 0.0000 | 0.0000 |
| 18 | $-1.4731 \times 10^{-3}$ | $6.7849 \times 10^{-4}$ | $1.0855 \times 10^{-4}$ | $-8.9259 \times 10^{-5}$ | 0.0000 | 0.0000 |

| | |
|---|---|
| Space from a conjugated position on the magnification side to the first surface of the projection lens device of the above data | 153.1 |

*aspheric surface
(ad: aperture diaphragm)

The values of Example 1 corresponding to the conditional expressions (1) to (8) are shown in Table 13 (which will be described later), and satisfy the conditional expressions (1) to (8) (the values also satisfy conditional expressions (1') and (5')).

EXAMPLE 2

Figure 3:
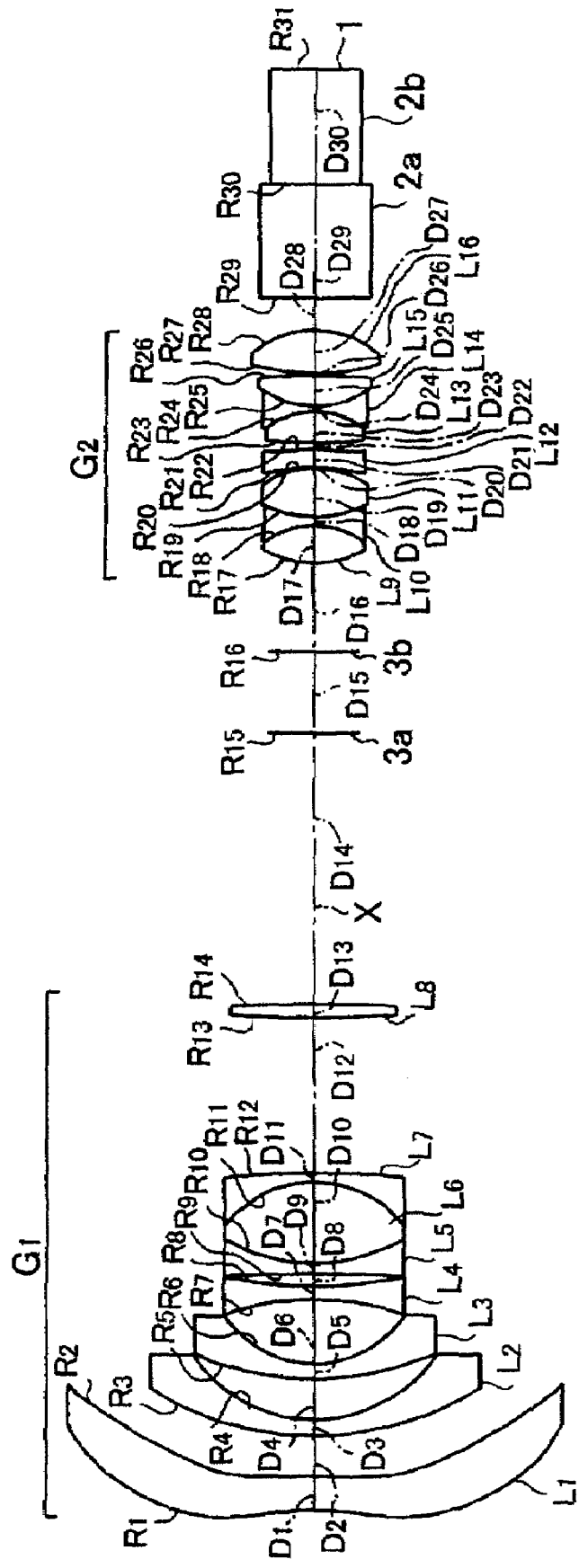
FIG. 3 is a diagram illustrating the configuration of a projection lens device according to Example 2 of the invention.

The configuration of a projection lens device according to Example 2 is shown in FIG. 3, and is similar to the projection lens device according to Example 1 in that a first lens group $G_1$ having a negative refractive power, aperture diaphragms (masks) 3a and 3b, and a second lens group $G_2$ having a positive refractive power are arranged in order from a magnification side, and the projection lens device is substantially telecentric on a reduction side thereof.

The first lens group $G_1$ includes, in order from the magnification side, a first lens $L_1$ formed of an aspheric lens having a low refractive power, a second lens $L_2$ and a third lens $L_3$ which are formed of negative meniscus lenses having concave surfaces directed to the reduction side, a fourth lens $L_4$ formed of a biconcave lens, a three-element cemented lens formed by sandwiching a sixth lens $L_6$ formed of a biconvex lens between a fifth lens $L_5$ and a seventh lens $L_7$ which are formed of negative lenses, and an eighth lens $L_8$ formed of a biconvex lens.

On the other hand, the second lens group $G_2$ includes, in order from the magnification side, a three-element cemented lens formed by sandwiching a tenth lens $L_{10}$ formed of a biconcave lens between a ninth lens $L_9$ and an eleventh lens $L_{11}$ which are formed of positive lenses, a twelfth lens $L_{12}$ formed of an aspheric lens having a convex surface directed to the reduction side, a three-element cemented lens formed by sandwiching a fourteenth lens $L_{14}$ formed of a biconcave lens between a thirteenth lens $L_{13}$ and a fifteenth lens $L_{15}$ which formed of positive lenses, and a sixteenth lens $L_{16}$ formed of a biconvex lens.

In addition, instead of the cover glass 2 according to Example 1, glass blocks 2a and 2b such as a synthesizing prism are provided.

The upper portion of Table 2 shows R which is a radius of curvature of each lens surface in the projection lens device according to the Example 2, D which is an on-axis surface space of each lens, $N_d$ which is a refractive index of each lens at d-line, and a $v_d$ which is an Abbe number of each lens at the d-line. In addition, the lower portion of Table 2 shows constants K and $A_3$ to $A_{12}$ corresponding to the respective aspheric surfaces. The lowest portion of Table 2 shows a projection distance (a space from a conjugated position on the magnification side to the first surface of the lens device).

TABLE 2

| surface | R | D | Nd | vd |
|---|---|---|---|---|
| 1* | −15.4481 | 1.5000 | 1.49100 | 57.6 |
| 2* | −830.0043 | 1.7938 | | |
| 3 | 13.5729 | 0.7168 | 1.83493 | 44.5 |
| 4 | 6.4498 | 1.7778 | | |
| 5 | 13.0918 | 0.6720 | 1.77290 | 50.7 |
| 6 | 4.7915 | 2.8130 | | |
| 7 | −11.9303 | 0.5600 | 1.73731 | 54.3 |
| 8 | 19.9722 | 0.5525 | | |
| 9 | −63.7237 | 0.4502 | 1.48749 | 70.2 |
| 10 | 7.9236 | 3.5564 | 1.74073 | 28.0 |
| 11 | −4.9776 | 0.4032 | 1.83500 | 23.3 |
| 12 | −39.3030 | 6.8825 | | |

TABLE 2-continued

| | | | | |
|---|---|---|---|---|
| 13 | 69.2531 | 0.5955 | 1.83496 | 23.3 |
| 14 | −67.2962 | 11.9359 | | |
| 15 (mask) | ∞ | 3.6218 | | |
| 16 (ad) | ∞ | 3.9330 | | |
| 17 | 4.9323 | 1.6299 | 1.62982 | 35.0 |
| 18 | −3.6153 | 0.3808 | 1.83500 | 44.5 |
| 19 | 5.2658 | 2.1335 | 1.49700 | 81.6 |
| 20 | −4.1121 | 0.0537 | | |
| 21* | −5.4522 | 0.7844 | 1.51007 | 56.2 |
| 22* | −7.1339 | 0.2966 | | |
| 23 | 36.1271 | 1.3441 | 1.48749 | 70.2 |
| 24 | −3.4461 | 0.2352 | 1.83500 | 44.3 |
| 25 | 4.2232 | 1.3343 | 1.49700 | 81.6 |
| 26 | −34.1077 | 0.1170 | | |
| 27 | 10.9568 | 1.9228 | 1.49700 | 81.6 |
| 28 | −4.2332 | 1.4179 | | |
| 29 | ∞ | 4.9839 | 1.58913 | 61.1 |
| 30 | ∞ | 5.0063 | 1.51680 | 64.2 |
| 31 | ∞ | | | | aspheric surface coefficient

| surface | K | $A_3$ | $A_4$ | $A_5$ | $A_6$ |
|---|---|---|---|---|---|
| 1 | 0.8000 | $-1.2921 \times 10^{-2}$ | $6.7589 \times 10^{-3}$ | $-5.2319 \times 10^{-4}$ | $-9.6044 \times 10^{-5}$ |
| 2 | −2.7978 | $-1.3389 \times 10^{-2}$ | $6.0856 \times 10^{-3}$ | $-4.5776 \times 10^{-4}$ | $-6.2007 \times 10^{-6}$ |
| 21 | 1.0000 | 0.0000 | $6.9673 \times 10^{-3}$ | $9.4592 \times 10^{-4}$ | $5.0206 \times 10^{-5}$ |
| 22 | 1.0000 | 0.0000 | $8.0342 \times 10^{-3}$ | $1.2230 \times 10^{-3}$ | $2.3494 \times 10^{-4}$ |

| surface | $A_7$ | $A_8$ | $A_9$ | $A_{10}$ | $A_{11}$ | $A_{12}$ |
|---|---|---|---|---|---|---|
| 1 | $2.0035 \times 10^{-5}$ | $-9.1115 \times 10^{-7}$ | $-6.8598 \times 10^{-8}$ | $8.0377 \times 10^{-9}$ | $-2.1356 \times 10^{-10}$ | $4.6056 \times 10^{-14}$ |
| 2 | $-1.3316 \times 10^{-6}$ | $-6.2335 \times 10^{-7}$ | $1.4616 \times 10^{-7}$ | $4.8760 \times 10^{-9}$ | $-1.9550 \times 10^{-9}$ | $8.4103 \times 10^{-11}$ |
| 21 | $-3.7915 \times 10^{-5}$ | $-5.0932 \times 10^{-5}$ | $2.1190 \times 10^{-6}$ | $4.0202 \times 10^{-6}$ | 0.0000 | 0.0000 |
| 22 | $-7.2712 \times 10^{-5}$ | $-3.3338 \times 10^{-5}$ | $3.7802 \times 10^{-6}$ | $5.7136 \times 10^{-6}$ | 0.0000 | 0.0000 |

| | |
|---|---|
| Space from a conjugated position on the magnification side to the first surface of the projection lens device of the above data | 128.5 |

*aspheric surface
(ad: aperture diaphragm)

The values of Example 2 corresponding to the conditional expressions (1) to (7) are shown in Table 13 (which will be described late), and satisfy the conditional expressions (1) to (7) (the values also satisfy conditional expressions (1') and (5')).

EXAMPLE 3

Figure 4:
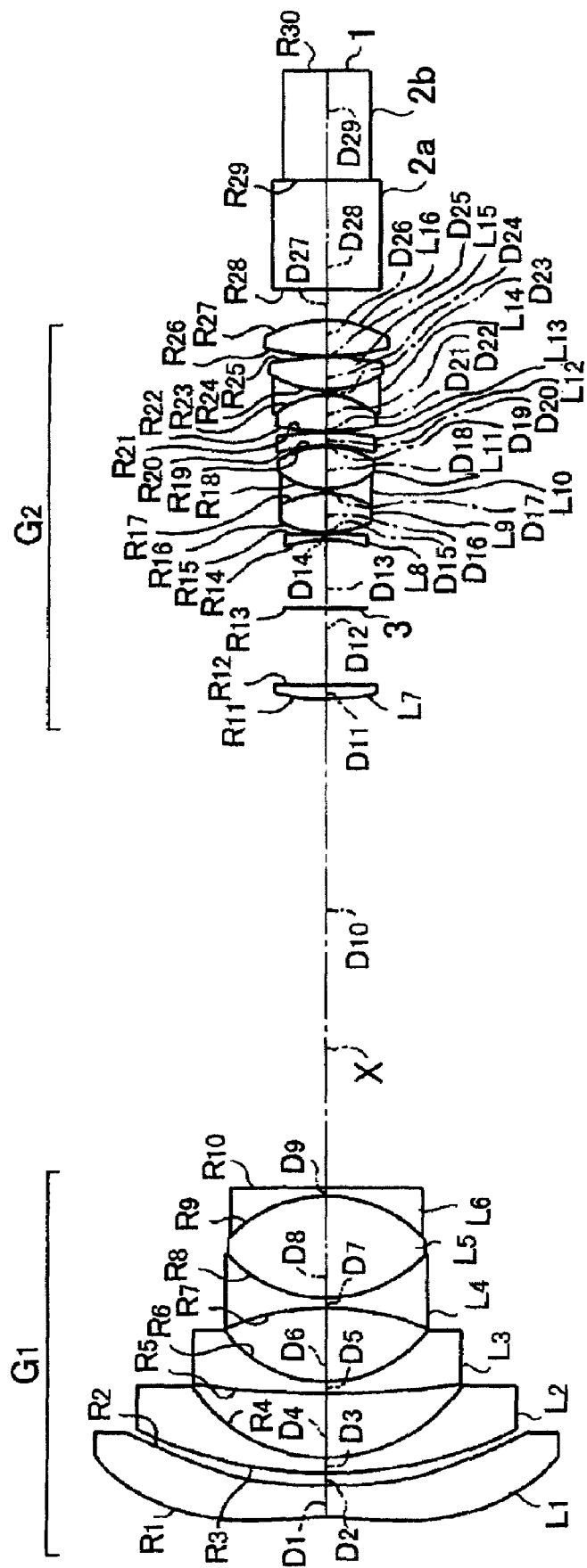
FIG. 4 is a diagram illustrating the configuration of a projection lens device according to Example 3 of the invention.
Figure 5:
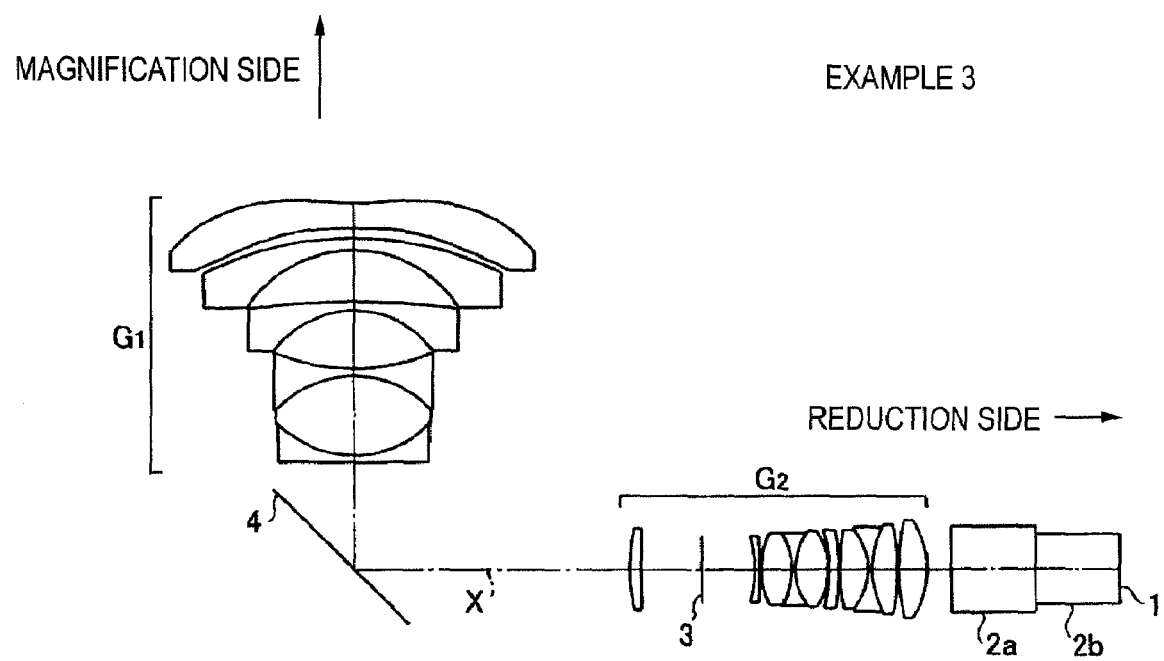
FIG. 5 is a diagram illustrating the configuration in which a reflection mirror for deflecting an optical path is disposed in the projection lens device shown in FIG. 4.

The configuration of a projection lens device according to Example 3 is shown in FIG. 4. In the projection lens device, there are arranged, in order from a magnification side, a first lens group $G_1$ having a negative refractive power, and a second lens group $G_2$ having a positive refractive power. The projection lens device is substantially telecentric on a reduction side thereof. Also, a space between the first lens group $G_1$ and the second lens group $G_2$ is set as the maximum inter-lens space (the maximum air space). In addition, FIG. 5 illustrates the configuration in which a reflection mirror 4 serving as an optical-path deflecting unit for deflecting an optical path is disposed between the first lens group $G_1$ and the second lens group $G_2$ of the projection lens device shown in FIG. 4.

The first lens group $G_1$ includes, in order from the magnification side, a first lens $L_1$ formed of an aspheric lens having a low refractive power, a second lens $L_2$ and a third lens $L_3$ which are formed of negative meniscus lenses having concave surfaces directed to the reduction side, and a three-element cemented lens formed by sandwiching a fifth lens $L_5$ formed of a biconvex lens between a fourth lens $L_4$ and a sixth lens $L_6$ which are formed of negative lenses.

On the other hand, the second lens group $G_2$ includes, in order from the magnification side, a seventh lens $L_7$ formed of a positive lens, an aperture diaphragm 3, an eighth lens $L_8$ formed of a negative lens, a three-element cemented lens formed by sandwiching a tenth lens $L_{10}$ formed of a biconcave lens between a ninth lens $L_9$ and a eleventh lens $L_{11}$ which are formed of positive lenses, a twelfth lens $L_{12}$ formed of an aspheric lens having a convex surface directed to the reduction side, a three-element cemented lens formed by sandwiching a fourteenth lens $L_{14}$ formed of a biconcave lens between a thirteenth lens $L_{13}$ and a fifteenth lens $L_{15}$ which are formed of positive lenses, and a sixteenth lens $L_{16}$ formed of a biconvex lens.

In addition, instead of the cover glass 2 according to Example 1, glass blocks $2a$ and $2b$ such as a synthesizing prism are provided.

Figure 6:
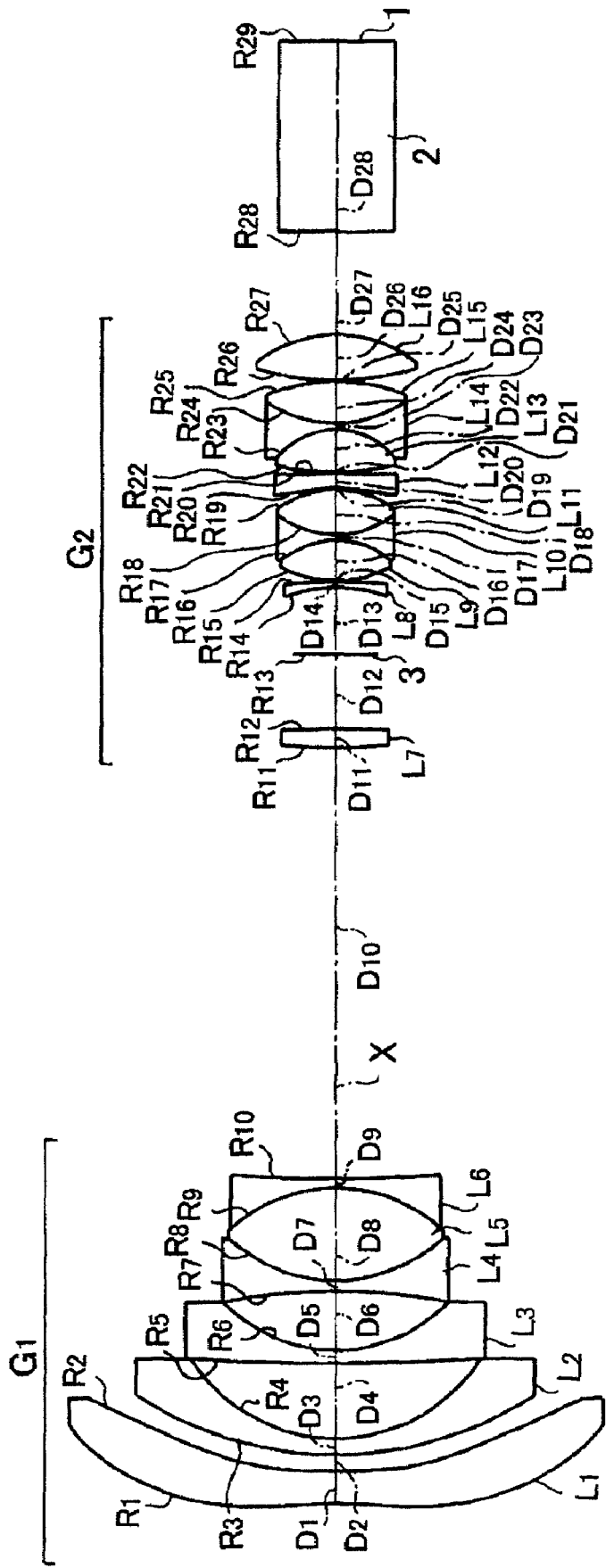
FIG. 6 is a diagram illustrating the configuration of a projection lens device according to Example 4 of the invention.

The upper portion of Table 3 shows R which is a radius of curvature of each lens surface in the projection lens device according to the Example 3, D which is an on-axis surface space of each lens, $N_d$ which is a refractive index of each lens at d-line, and $v_d$ which is an Abbe number of each lens at the d-line. Also, the lower portion of Table 3 shows constants K and $A_3$ to $A_{12}$ corresponding to the respective aspheric surfaces. In addition, in this Example, the first lens $L_1$ is configured to move in a direction of the optical axis X in accordance with variation in projection distance. The lowest portion of Table 3 shows 'variable 1' and 'variable 2', which are distances between the lenses and vary in accordance with a projection distance (a space from a conjugated position on the magnification side to the first surface of the lens device).

disposed between the first lens group $G_1$ and the second lens group $G_2$ of the projection lens device shown in FIG. 6.

TABLE 3

| surface | R | D | Nd | vd |
|---|---|---|---|---|
| 1* | −15.3150 | 1.4656 | 1.49100 | 57.6 |
| 2* | 113.4166 | variable 1 | | |
| 3 | 19.7970 | 0.7106 | 1.69680 | 55.5 |
| 4 | 7.4568 | 2.9385 | | |
| 5 | 44.4137 | 0.5330 | 1.62041 | 60.3 |
| 6 | 5.7756 | 3.3509 | | |
| 7 | −11.8875 | 0.4486 | 1.49700 | 81.6 |
| 8 | 6.1685 | 4.6013 | 1.69895 | 30.1 |
| 9 | −6.1685 | 0.3997 | 1.84666 | 23.8 |
| 10 | −717.8035 | variable 2 | | |
| 11 | 10.1505 | 0.6363 | 1.62004 | 36.3 |
| 12 | 67.1454 | 3.5531 | | |
| 13 (ad) | ∞ | 3.1238 | | |
| 14 | −6.1346 | 0.2888 | 1.80400 | 46.6 |
| 15 | −27.2063 | 0.0444 | | |
| 16 | 4.8306 | 1.7763 | 1.63980 | 34.5 |
| 17 | −4.3956 | 0.2221 | 1.80400 | 46.6 |
| 18 | 3.5776 | 1.9192 | 1.49700 | 81.6 |
| 19 | −4.1451 | 0.0444 | | |
| 20* | −8.0752 | 0.5996 | 1.51007 | 56.2 |
| 21* | −11.6868 | 0.0444 | | |
| 22 | 11.9634 | 1.6512 | 1.48749 | 70.2 |
| 23 | −3.4939 | 0.2221 | 1.78590 | 44.2 |
| 24 | 4.9855 | 1.4855 | 1.51633 | 64.1 |
| 25 | −13.8531 | 0.0666 | | |
| 26 | 11.2459 | 1.6534 | 1.49700 | 81.6 |
| 27 | −5.4975 | 1.4079 | | |
| 28 | ∞ | 4.9410 | 1.58913 | 61.1 |
| 29 | ∞ | 4.9632 | 1.51680 | 64.2 |
| 30 | ∞ | | | |

| aspheric surface coefficient | | | | | |
|---|---|---|---|---|---|
| surface | K | $A_3$ | $A_4$ | $A_5$ | $A_6$ |
| 1 | 0.8000 | $2.9334 \times 10^{-3}$ | $1.2155 \times 10^{-3}$ | $1.1038 \times 10^{-4}$ | $-1.0895 \times 10^{-4}$ |
| 2 | −2.7978 | $2.6695 \times 10^{-3}$ | $1.5322 \times 10^{-3}$ | $-3.9710 \times 10^{-4}$ | $4.3215 \times 10^{-5}$ |
| 20 | 1.0000 | 0.0000 | $3.0774 \times 10^{-3}$ | $-5.7463 \times 10^{-3}$ | $3.5460 \times 10^{-3}$ |
| 21 | 1.0000 | 0.0000 | $4.3644 \times 10^{-3}$ | $-7.9720 \times 10^{-3}$ | $7.6558 \times 10^{-3}$ |

| surface | $A_7$ | $A_8$ | $A_9$ | $A_{10}$ | $A_{11}$ | $A_{12}$ |
|---|---|---|---|---|---|---|
| 1 | $1.8307 \times 10^{-5}$ | $-9.8591 \times 10^{-7}$ | $-5.5122 \times 10^{-8}$ | $9.4861 \times 10^{-9}$ | $-4.1053 \times 10^{-10}$ | $5.4154 \times 10^{-12}$ |
| 2 | $2.7172 \times 10^{-7}$ | $-1.0444 \times 10^{-6}$ | $1.0618 \times 10^{-7}$ | $5.9712 \times 10^{-9}$ | $-1.3742 \times 10^{-9}$ | $5.4108 \times 10^{-11}$ |
| 20 | $4.9393 \times 10^{-4}$ | $-1.3662 \times 10^{-3}$ | $5.1962 \times 10^{-4}$ | $-6.1998 \times 10^{-5}$ | 0.0000 | 0.0000 |
| 21 | $-3.4579 \times 10^{-3}$ | $6.4321 \times 10^{-4}$ | $8.8450 \times 10^{-5}$ | $-1.3700 \times 10^{-5}$ | 0.0000 | 0.0000 |

| | | | |
|---|---|---|---|
| Space from a conjugated position on the magnification side to the first surface of the projection lens device | 117.4 | 128.8 | 151.5 |
| variable space 1 (variable 1) | 0.5738 | 0.5552 | 0.5357 |
| variable space 2 (variable 2) | 22.3562 | 22.3473 | 22.3384 |

*aspheric surface
(ad: aperture diaphragm)

The values of Example 3 corresponding to the conditional expressions (1) to (8) are shown in Table 13 (which will be described later), and satisfy the conditional expressions (1) to (8) (the values also satisfy conditional expressions (1') and (5')).

EXAMPLE 4

Figure 7:
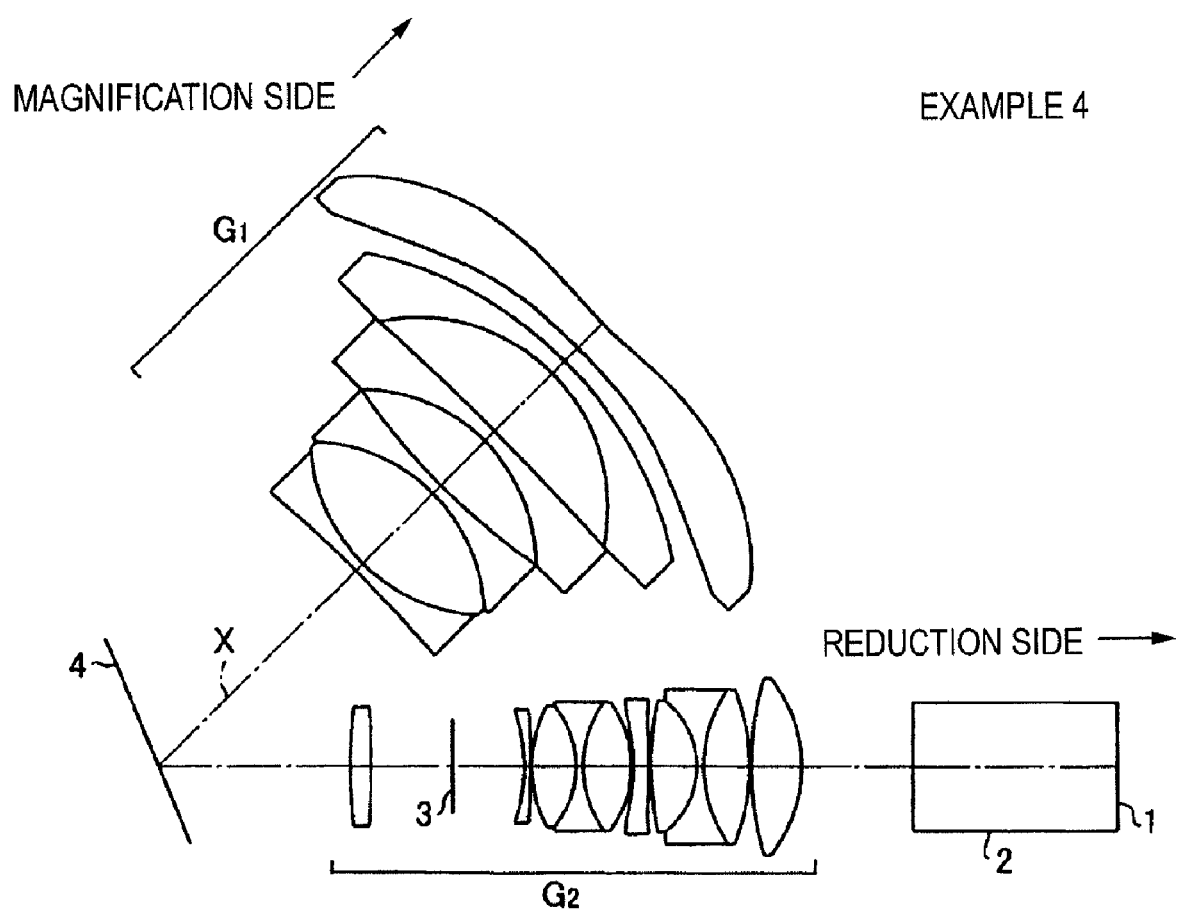
FIG. 7 is a diagram illustrating the configuration in which a reflection mirror for deflecting an optical path is disposed in the projection lens device shown in FIG. 6.

The configuration of a projection lens device according to Example 4 is shown in FIG. 6, and is substantially similar to the configuration of the projection lens device according to Example 3. Instead of the glass blocks 2a and 2b according to Example 3, a glass block 2 is provided. Also, FIG. 7 illustrates the configuration in which a reflection mirror 4 serving as an optical-path deflecting unit for deflecting an optical path is The upper portion of Table 4 shows R which is a radius of curvature of each lens surface in the projection lens device according to the Example 4, D which is an on-axis surface space of each lens, $N_d$ which is a refractive index of each lens at d-line, and $v_d$ which is an Abbe number of each lens at the d-line. Also, the lower portion of Table 4 shows constants K and $A_3$ to $A_{12}$ corresponding to the respective aspheric surfaces. In addition, in this Example, the first lens $L_1$ and the like are configured to move in a direction of the optical axis X in accordance with variation in projection distance. The lowest portion of Table 4 shows 'variable 1' and 'variable 2' which are distances between the lenses varies in accordance with a projection distance (a space from a conjugated position on the magnification side to the first surface of the lens device).

TABLE 4

| surface | R | D | Nd | νd |
|---|---|---|---|---|
| 1* | −13.2467 | 1.1882 | 1.49100 | 57.6 |
| 2* | 141.6726 | variable 1 | | |
| 3 | 13.3658 | 0.5941 | 1.69680 | 55.5 |
| 4 | 6.3950 | 2.7811 | | |
| 5 | 90.8270 | 0.4650 | 1.69680 | 55.5 |
| 6 | 5.9406 | 2.1491 | | |
| 7 | −22.4712 | 0.3737 | 1.60311 | 60.6 |
| 8 | 5.9730 | 3.3770 | 1.68893 | 31.1 |
| 9 | −5.9730 | 0.3272 | 1.80518 | 25.4 |
| 10 | 54.8422 | variable 2 | | |
| 11 | 22.0405 | 0.7026 | 1.80518 | 25.4 |
| 12 | −49.0666 | 2.7553 | | |
| 13 (ad) | ∞ | 2.4712 | | |
| 14 | −5.6913 | 0.2067 | 1.77250 | 49.6 |
| 15 | −24.3374 | 0.0344 | | |
| 16 | 4.4400 | 1.4999 | 1.64769 | 33.8 |
| 17 | −3.2502 | 0.2067 | 1.80400 | 46.6 |
| 18 | 3.7214 | 1.6566 | 1.49700 | 81.6 |
| 19 | −3.7214 | 0.0517 | | |
| 20* | −5.7402 | 0.5338 | 1.51007 | 56.2 |
| 21* | −12.9074 | 0.0517 | | |
| 22 | 10.6987 | 1.5636 | 1.49700 | 81.6 |
| 23 | −2.8700 | 0.2239 | 1.79952 | 42.2 |
| 24 | 4.7570 | 1.5206 | 1.48749 | 70.2 |
| 25 | −7.3306 | 0.0517 | | |
| 26 | 10.7312 | 1.6790 | 1.49700 | 81.6 |
| 27 | −4.9797 | 3.8025 | | |
| 28 | ∞ | 6.9399 | 1.51680 | 64.2 |
| 29 | ∞ | | | |

| aspheric surface coefficient | | | | | |
|---|---|---|---|---|---|
| surface | K | $A_3$ | $A_4$ | $A_5$ | $A_6$ |
| 1 | 0.8000 | $5.9921 \times 10^{-3}$ | $1.1963 \times 10^{-3}$ | $2.9393 \times 10^{-5}$ | $-9.7056 \times 10^{-5}$ |
| 2 | −2.7978 | $5.5227 \times 10^{-3}$ | $1.2885 \times 10^{-3}$ | $-3.7677 \times 10^{-4}$ | $3.7826 \times 10^{-5}$ |
| 20 | 1.0000 | 0.0000 | $1.2745 \times 10^{-2}$ | $-6.8868 \times 10^{-3}$ | $3.2482 \times 10^{-3}$ |
| 21 | 1.0000 | 0.0000 | $1.3359 \times 10^{-2}$ | $-9.1460 \times 10^{-3}$ | $7.7602 \times 10^{-3}$ |

| surface | $A_7$ | $A_8$ | $A_9$ | $A_{10}$ | $A_{11}$ | $A_{12}$ |
|---|---|---|---|---|---|---|
| 1 | $1.7693 \times 10^{-5}$ | $-9.6955 \times 10^{-7}$ | $-5.3643 \times 10^{-8}$ | $8.9497 \times 10^{-9}$ | $-3.8363 \times 10^{-10}$ | $6.1374 \times 10^{-12}$ |
| 2 | $1.1406 \times 10^{-7}$ | $-9.6844 \times 10^{-7}$ | $1.0403 \times 10^{-7}$ | $5.7356 \times 10^{-9}$ | $-1.3013 \times 10^{-9}$ | $4.8531 \times 10^{-11}$ |
| 20 | $5.7189 \times 10^{-4}$ | $-1.3761 \times 10^{-3}$ | $4.9591 \times 10^{-4}$ | $-4.6582 \times 10^{-5}$ | 0.0000 | 0.0000 |
| 21 | $-3.6157 \times 10^{-3}$ | $6.1874 \times 10^{-4}$ | $4.0942 \times 10^{-5}$ | $-1.5675 \times 10^{-5}$ | 0.0000 | 0.0000 |

| | | | |
|---|---|---|---|
| Space from a conjugated position on the magnification side to the first surface of the projection lens device | 81.0 | 89.8 | 98.6 |
| variable space 1 (variable 1) | 0.6372 | 0.6113 | 0.5855 |
| variable space 2 (variable 2) | 15.8933 | 15.8865 | 15.8796 |

*aspheric surface
(ad: aperture diaphragm)

The values of Example 4 corresponding to the conditional expressions (1) to (8) are shown in Table 13 (which will be described later), and satisfy the conditional expressions (1) to (8) (the values also satisfy conditional expressions (1') and (5')).

EXAMPLE 5

Figure 8:
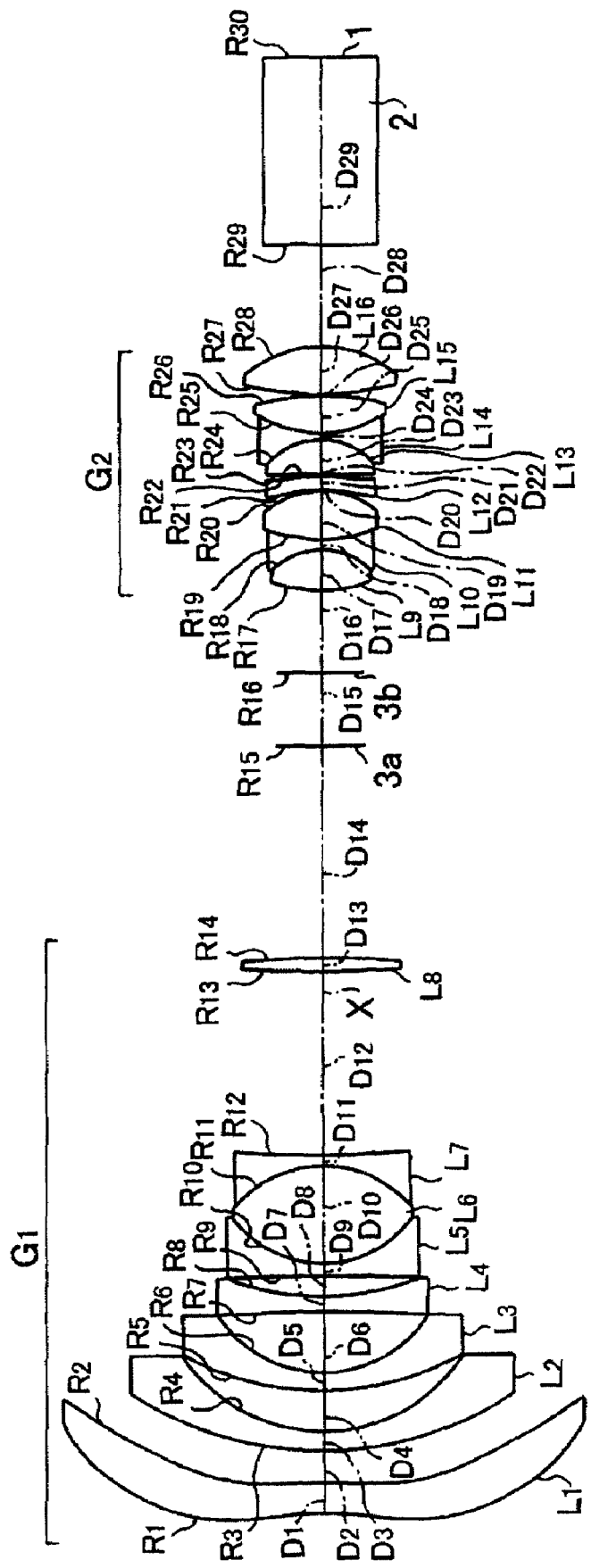
FIG. 8 is a diagram illustrating the configuration of a projection lens device according to Example 5 of the invention.
Figure 9:
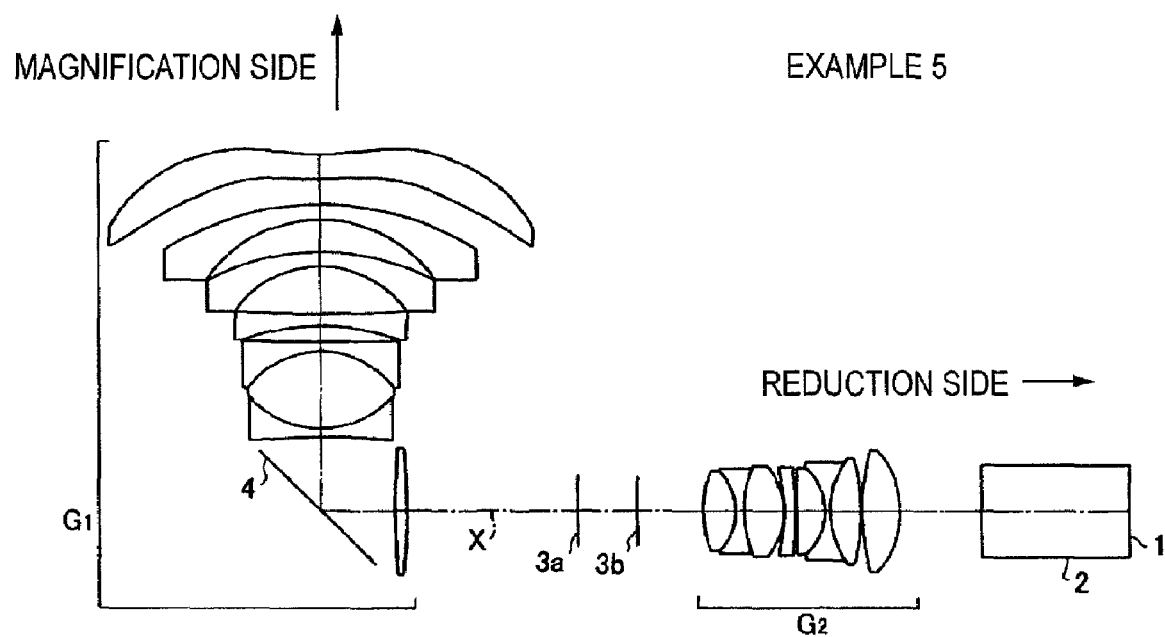
FIG. 9 is a diagram illustrating the configuration in which a reflection mirror for deflecting an optical path is disposed in the projection lens device shown in FIG. 8.

The configuration of a projection lens device according to Example 5 is shown in FIG. 8, and is substantially similar to the configuration of the projection lens device according to Example 2. Instead of the glass blocks 2a and 2b according to Example 2, a glass block 2 is provided. Also, FIG. 9 illustrates the configuration in which a reflection mirror 4 serving as an optical-path deflecting unit for deflecting an optical path is disposed in the first lens group $G_1$ of the projection lens device shown in FIG. 8.

The upper portion of Table 5 shows R which is a radius of curvature of each lens surface in the projection lens device according to the Example 5, D which is an on-axis surface space of each lens, $N_d$ which is a refractive index of each lens at d-line, and $\nu_d$ which is an Abbe number of each lens at the d-line. Also, the lower portion of Table 5 shows constants K and $A_3$ to $A_{12}$ corresponding to the respective aspheric surfaces. The lowest portion of Table 5 shows a projection distance (a space from a conjugated position on the magnification side to the first surface of the lens device).

TABLE 5

| surface | R | D | Nd | νd |
|---|---|---|---|---|
| 1* | −12.0424 | 1.1598 | 1.49100 | 57.6 |
| 2* | −43.3808 | 1.2223 | | |
| 3 | 13.4797 | 0.7264 | 1.83500 | 29.2 |
| 4 | 6.4375 | 1.5377 | | |
| 5 | 11.1153 | 0.6810 | 1.71300 | 53.9 |
| 6 | 4.8376 | 2.2780 | | |
| 7 | −64.6361 | 0.5675 | 1.74865 | 53.1 |
| 8 | 10.3649 | 0.7685 | | |
| 9 | −98.1907 | 0.4557 | 1.56592 | 62.5 |
| 10 | 4.2282 | 3.6845 | 1.66068 | 32.8 |
| 11 | −4.4278 | 0.4086 | 1.80000 | 29.4 |
| 12 | 40.5244 | 6.9846 | | |
| 13 | 47.1824 | 0.5226 | 1.84666 | 23.8 |
| 14 | −35.0059 | 8.0155 | | |
| 15 (mask) | ∞ | 2.7938 | | |
| 16 (ad) | ∞ | 3.1208 | | |
| 17 | 5.6110 | 1.5362 | 1.59978 | 38.0 |
| 18 | −2.7198 | 0.3859 | 1.79997 | 48.0 |
| 19 | 6.0112 | 1.8481 | 1.48999 | 65.4 |
| 20 | −3.3655 | 0.0524 | | |
| 21* | −4.1183 | 0.5081 | 1.49100 | 57.6 |
| 22* | −5.6815 | 0.0520 | | |
| 23 | −246.8363 | 1.3210 | 1.48749 | 70.2 |
| 24 | −2.7519 | 0.2384 | 1.80000 | 43.1 |
| 25 | 4.5246 | 1.4102 | 1.49700 | 81.6 |
| 26 | −9.9213 | 0.0523 | | |
| 27 | 11.3833 | 1.8121 | 1.49700 | 81.6 |
| 28 | −4.5102 | 3.8581 | | |
| 29 | ∞ | 7.0370 | 1.51680 | 64.2 |
| 30 | ∞ | | | | aspheric surface coefficient

| surface | K | $A_3$ | $A_4$ | $A_5$ | $A_6$ |
|---|---|---|---|---|---|
| 1 | 0.8000 | $-6.2163 \times 10^{-3}$ | $5.6388 \times 10^{-3}$ | $-4.7367 \times 10^{-4}$ | $-8.6526 \times 10^{-5}$ |
| 2 | −2.7978 | $-7.6026 \times 10^{-3}$ | $5.3017 \times 10^{-3}$ | $-4.6780 \times 10^{-4}$ | $-4.2871 \times 10^{-6}$ |
| 21 | 1.0000 | 0.0000 | $1.7564 \times 10^{-2}$ | $-1.3958 \times 10^{-3}$ | $2.4114 \times 10^{-4}$ |
| 22 | 1.0000 | 0.0000 | $1.5726 \times 10^{-2}$ | $1.6372 \times 10^{-4}$ | $-3.3644 \times 10^{-4}$ |

| surface | $A_7$ | $A_8$ | $A_9$ | $A_{10}$ | $A_{11}$ | $A_{12}$ |
|---|---|---|---|---|---|---|
| 1 | $1.8593 \times 10^{-5}$ | $-8.3563 \times 10^{-7}$ | $-6.3065 \times 10^{-8}$ | $6.9428 \times 10^{-9}$ | $-1.9871 \times 10^{-10}$ | $3.4507 \times 10^{-12}$ |
| 2 | $-8.2118 \times 10^{-7}$ | $-5.3219 \times 10^{-7}$ | $1.3171 \times 10^{-7}$ | $3.8996 \times 10^{-9}$ | $-1.7726 \times 10^{-9}$ | $7.7991 \times 10^{-11}$ |
| 21 | $-1.0392 \times 10^{-5}$ | $-1.1566 \times 10^{-4}$ | $-1.1849 \times 10^{-5}$ | $1.6492 \times 10^{-5}$ | 0.0000 | 0.0000 |
| 22 | $-1.7879 \times 10^{-5}$ | $1.9937 \times 10^{-5}$ | $-3.6708 \times 10^{-5}$ | $1.0565 \times 10^{-5}$ | 0.0000 | 0.0000 |

| | |
|---|---|
| Space from a conjugated position on the magnification side to the first surface of the projection lens device of the above data | 89.5 |

*aspheric surface
(ad: aperture diaphragm)

The values of Example 5 corresponding to the conditional expressions (1) to (8) are shown in Table 13 (which will be described later), and satisfy the conditional expressions (1) to (8) (the values also satisfy conditional expressions (1') and (5')).

EXAMPLE 6

Figure 10:
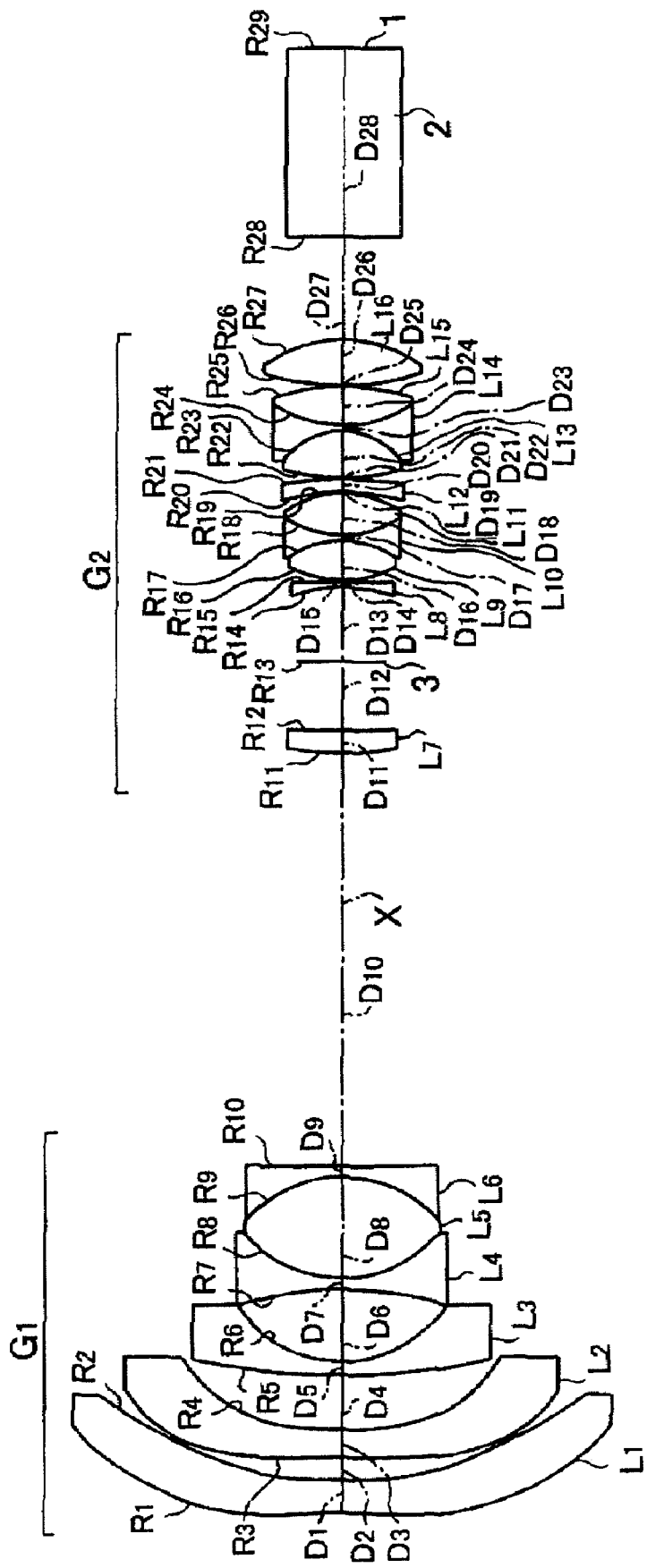
FIG. 10 is a diagram illustrating the configuration of a projection lens device according to Example 6 of the invention.

The configuration of a projection lens device according to Example 6 is shown in FIG. 10, and is substantially similar to the configuration of the projection lens device according to Example 4. However, the configuration of Example 6 is different from that of the Example 4 in that a second lens $L_2$ is formed of an aspheric lens having a low refractive power.

The upper portion of Table 6 shows R which is a radius of curvature of each lens surface in the projection lens device according to the Example 6, D which is an on-axis surface space of each lens, $N_d$ which is a refractive index of each lens at d-line, and $\nu_d$ which is an Abbe number of each lens at the d-line. Also, the lower portion of Table 6, shows constants K and $A_3$ to $A_{12}$ corresponding to the respective aspheric surfaces. The lowest portion of Table 6 shows a projection distance (a space from a conjugated position on the magnification side to the first surface of the lens device).

TABLE 6

| surface | R | D | Nd | νd |
|---|---|---|---|---|
| 1* | −15.1039 | 1.2198 | 1.49100 | 57.6 |
| 2* | 85.5906 | 0.8451 | | |
| 3* | −79.8216 | 1.0422 | 1.49100 | 57.6 |
| 4* | 19.0678 | 2.0412 | | |
| 5 | 26.9718 | 0.5037 | 1.77250 | 49.6 |
| 6 | 4.8343 | 2.6876 | | |
| 7 | −13.8067 | 0.4186 | 1.65160 | 58.5 |
| 8 | 4.9627 | 3.7483 | 1.71736 | 29.5 |
| 9 | −4.9627 | 0.3908 | 1.84666 | 23.8 |
| 10 | 175.7698 | 15.5071 | | |
| 11 | 11.7014 | 0.8486 | 1.84666 | 23.8 |
| 12 | 45.5942 | 2.6054 | | |
| 13 (ad) | ∞ | 2.8087 | | |
| 14 | −6.0977 | 0.2084 | 1.80400 | 46.6 |
| 15 | −93.7189 | 0.0602 | | |
| 16 | 4.2878 | 1.4627 | 1.62588 | 35.7 |
| 17 | −3.7012 | 0.2084 | 1.80400 | 46.6 |
| 18 | 3.9304 | 1.5719 | 1.49700 | 81.6 |
| 19 | −3.9304 | 0.0521 | | |
| 20* | −7.2098 | 0.4690 | 1.51007 | 56.2 |
| 21* | −12.3295 | 0.0532 | | |
| 22 | 8.1741 | 1.7478 | 1.49700 | 81.6 |
| 23 | −2.8475 | 0.2258 | 1.80400 | 46.6 |
| 24 | 4.8476 | 1.4281 | 1.48749 | 70.2 |
| 25 | −8.9835 | 0.0521 | | |
| 26 | 10.2377 | 1.7093 | 1.49700 | 81.6 |
| 27 | −5.1518 | 3.8803 | | |
| 28 | ∞ | 6.9999 | 1.51680 | 64.2 |
| 29 | ∞ | | | |

| | | aspheric surface coefficient | | | |
|---|---|---|---|---|---|
| surface | K | $A_3$ | $A_4$ | $A_5$ | $A_6$ |
| 1 | 0.8000 | $3.1360 \times 10^{-3}$ | $2.7864 \times 10^{-3}$ | $-2.9486 \times 10^{-4}$ | $-7.6745 \times 10^{-5}$ |
| 2 | −2.7978 | $3.8604 \times 10^{-3}$ | $1.9327 \times 10^{-3}$ | $-3.9889 \times 10^{-4}$ | $2.3207 \times 10^{-5}$ |
| 3 | 1.0000 | 0.0000 | $9.9258 \times 10^{-4}$ | $-1.6990 \times 10^{-5}$ | $-6.3720 \times 10^{-6}$ |
| 4 | 1.0000 | 0.0000 | $1.6247 \times 10^{-3}$ | $-7.9270 \times 10^{-5}$ | $-9.1718 \times 10^{-6}$ |
| 20 | 1.0000 | 0.0000 | $3.4336 \times 10^{-3}$ | $-2.3125 \times 10^{-3}$ | $8.1450 \times 10^{-4}$ |
| 21 | 1.0000 | 0.0000 | $4.6538 \times 10^{-3}$ | $-5.0003 \times 10^{-3}$ | $4.9602 \times 10^{-3}$ |

| surface | $A_7$ | $A_8$ | $A_9$ | $A_{10}$ | $A_{11}$ | $A_{12}$ |
|---|---|---|---|---|---|---|
| 1 | $1.8707 \times 10^{-5}$ | $-9.9307 \times 10^{-7}$ | $-7.2267 \times 10^{-8}$ | $7.9574 \times 10^{-9}$ | $-3.7207 \times 10^{-11}$ | $-9.3699 \times 10^{-12}$ |
| 2 | $1.7131 \times 10^{-7}$ | $-7.3029 \times 10^{-7}$ | $1.1252 \times 10^{-7}$ | $4.1783 \times 10^{-9}$ | $-1.5325 \times 10^{-9}$ | $6.6826 \times 10^{-11}$ |
| 3 | $-2.0749 \times 10^{-7}$ | $-2.3344 \times 10^{-8}$ | $5.8675 \times 10^{-9}$ | $1.3467 \times 10^{-9}$ | $-6.3125 \times 10^{-12}$ | $-7.8494 \times 10^{-12}$ |
| 4 | $3.3653 \times 10^{-7}$ | $6.5887 \times 10^{-7}$ | $-5.7725 \times 10^{-8}$ | $3.1191 \times 10^{-9}$ | $-4.3100 \times 10^{-10}$ | $-1.1033 \times 10^{-11}$ |
| 20 | $8.1957 \times 10^{-4}$ | $-7.5724 \times 10^{-4}$ | $2.0872 \times 10^{-4}$ | $-1.5193 \times 10^{-5}$ | 0.0000 | 0.0000 |
| 21 | $-2.3705 \times 10^{-3}$ | $3.9652 \times 10^{-4}$ | $6.2337 \times 10^{-5}$ | $-2.5079 \times 10^{-5}$ | 0.0000 | 0.0000 |

| | |
|---|---|
| Space from a conjugated position on the magnification side to the first surface of the projection lens device of the above data | 89.5 |

*aspheric surface
(ad: aperture diaphragm)

The values of Example 6 corresponding to the conditional expressions (1) to (7) are shown in Table 13 (which will be described later), and satisfy the conditional expressions (1) to (7) (the values also satisfy conditional expressions (1') and (5')).

EXAMPLE 7

Figure 11:
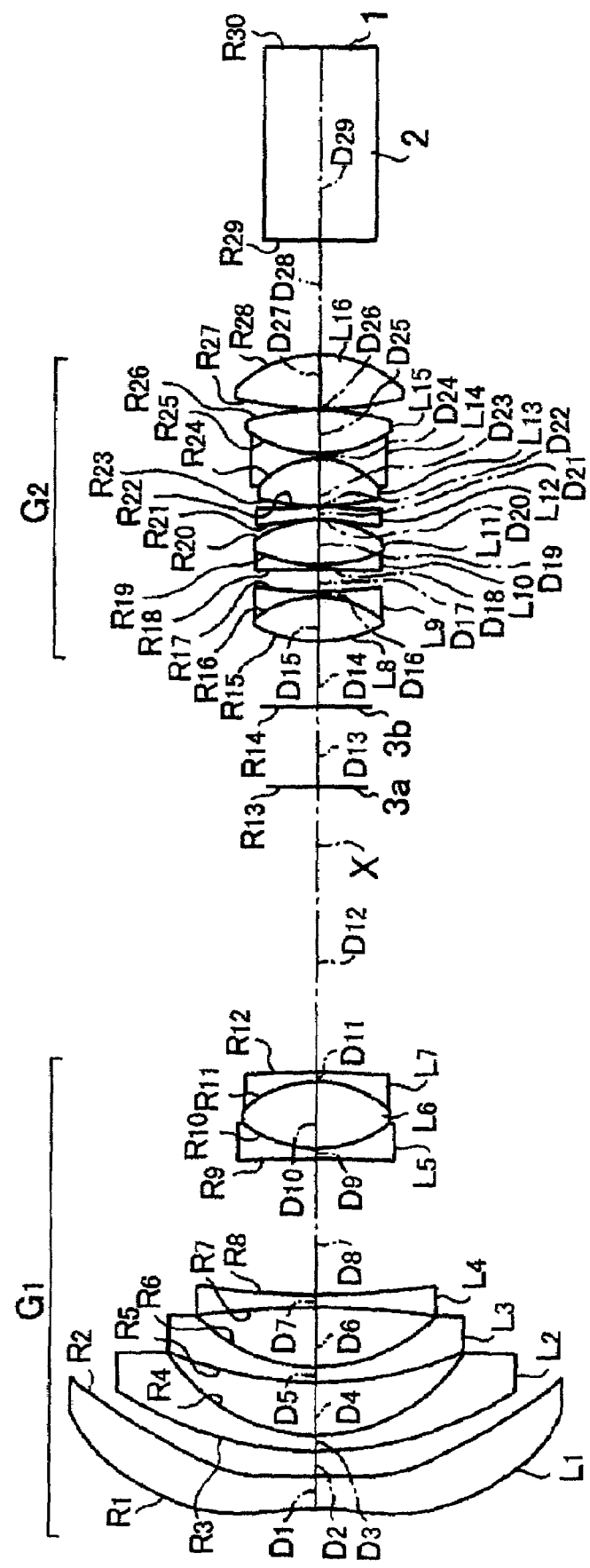
FIG. 11 is a diagram illustrating the configuration of a projection lens device according to Example 7 of the invention.

The configuration of a projection lens device according to Example 7 is shown in FIG. 11, and is similar to the projection lens device according to Example 2 in that a first lens group $G_1$ having a negative refractive power, a mask $3a$, an aperture diaphragm $3b$, and a second lens group $G_2$ having a positive refractive power are arranged in order from a magnification side, and that the projection lens device is substantially telecentric on a reduction side thereof.

The first lens group $G_1$ includes, in order from the magnification side, a first lens $L_1$ formed of an aspheric lens having a low refractive power, a second lens $L_2$ and a third lens $L_3$ which are formed of negative meniscus lenses having concave surfaces directed to the reduction side, a fourth lens $L_4$ formed of a biconcave lens, and a three-element cemented lens formed by sandwiching a sixth lens $L_6$ formed of a biconvex lens between a fifth lens $L_5$ and a seventh lens $L_7$ which are formed of negative lenses.

On the other hand, the second lens group $G_2$ includes, in order from the magnification side, a two-element cemented lens formed by cementing an eighth lens $L_8$ formed of a biconvex lens and a ninth lens $L_9$ formed of a biconcave lens, a two-element cemented lens formed by cementing a tenth lens $L_{10}$ formed of a biconcave lens and an eleventh lens $L_{11}$ formed of a biconvex lens, a twelfth lens $L_{12}$ formed of an aspheric lens having a convex surface directed to the reduction side, a three-element cemented lens formed by sandwiching a fourteenth lens $L_{14}$ formed of a biconcave lens between a thirteenth lens $L_{13}$ and a fifteenth lens $L_{15}$ which are formed of positive lenses, and a sixteenth lens $L_{16}$ formed of a biconvex lens.

Also, a glass block 2 such as a color synthesizing prism is provided on the reduction side of the second lens group $G_2$.

The upper portion of Table 7 shows R which is a radius of curvature of each lens surface in the projection lens device according to the Example 7, D which is an on-axis surface space of each lens, $N_d$ which is a refractive index of each lens at d-line, and $v_d$ which is an Abbe number of each lens at the d-line. Also, the lower portion of Table 7 shows constants K and $A_3$ to $A_{12}$ corresponding to the respective aspheric surfaces. The lowest portion of Table 7 shows a projection distance (a space from a conjugated position on the magnification side to the first surface of the lens device).

The values of Example 7 corresponding to the conditional expressions (1) to (7) are shown in Table 13 (which will be described later), and satisfy the conditional expressions (1) to (7) (the values also satisfy conditional expressions (1') and (5')).

EXAMPLE 8

Figure 12:
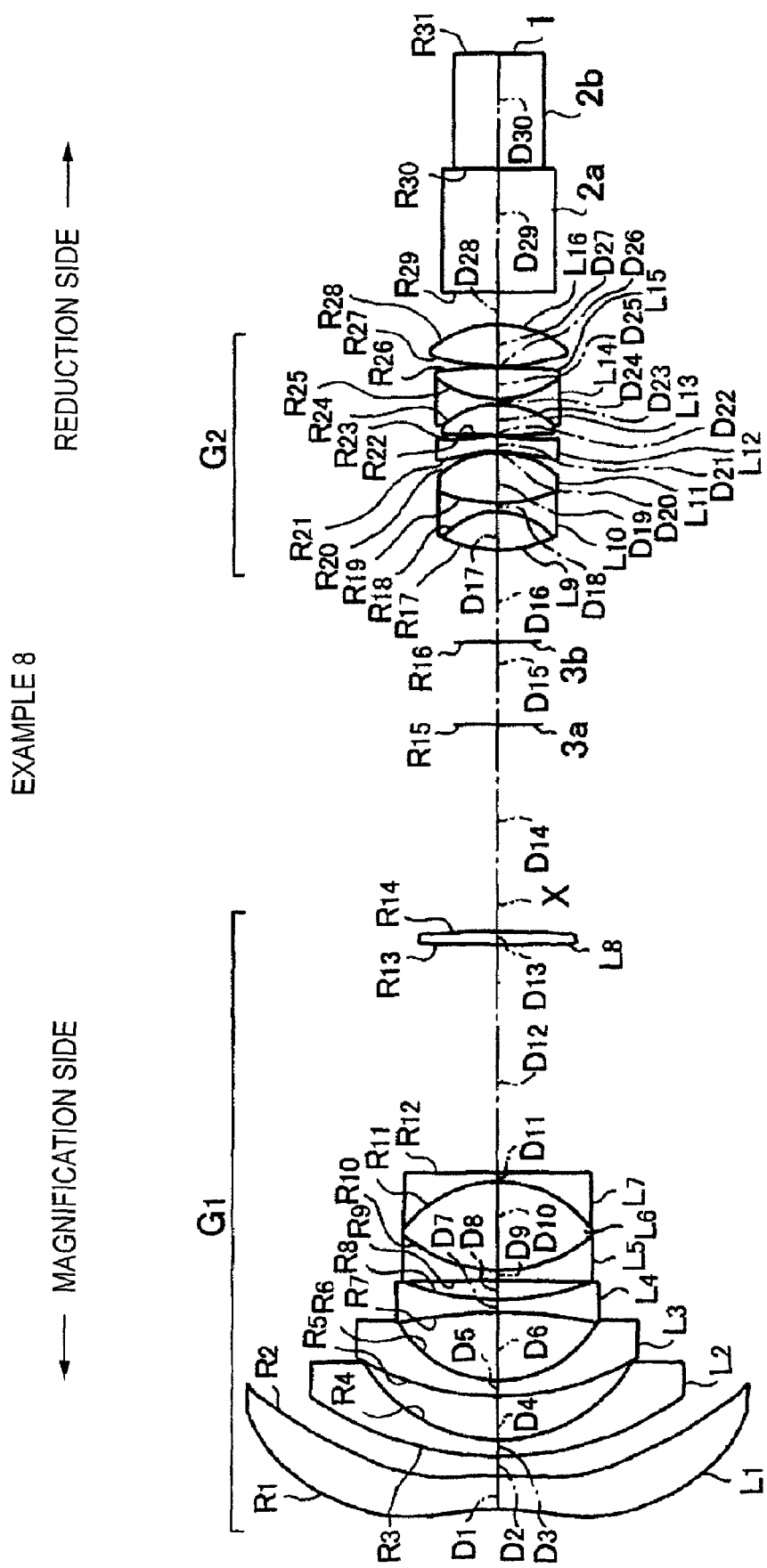
FIG. 12 is a diagram illustrating the configuration of a projection lens device according to Example 8 of the invention.

The configuration of a projection lens device according to Example 8 is shown in FIG. 12, and is substantially similar to the configuration of the projection lens device according to Example 2 shown in FIG. 3.

The upper portion of Table 8 shows R which is a radius of curvature of each lens surface in the projection lens device according to the Example 8, D which is an on-axis surface space of each lens, $N_d$ which is a refractive index of each lens at d-line, and $V_d$ which is an Abbe number of each lens at the d-line. Also, the lower portion of Table 8 shows constants K

TABLE 7

| surface | R | D | Nd | vd |
|---|---|---|---|---|
| 1* | −15.8924 | 1.4382 | 1.49100 | 57.6 |
| 2* | −166.6716 | 1.1063 | | |
| 3 | 16.1213 | 0.7080 | 1.83500 | 44.5 |
| 4 | 7.9316 | 2.3193 | | |
| 5 | 16.9450 | 0.6638 | 1.83500 | 44.5 |
| 6 | 7.6299 | 2.6136 | | |
| 7 | −41.8741 | 0.5531 | 1.83500 | 44.4 |
| 8 | 34.8918 | 5.9448 | | |
| 9 | −69.3176 | 0.4447 | 1.75322 | 52.7 |
| 10 | 5.4763 | 2.9836 | 1.64974 | 33.6 |
| 11 | −4.9523 | 0.3983 | 1.80584 | 47.4 |
| 12 | −47.5632 | 12.6025 | | |
| 13 (mask) | ∞ | 3.5775 | | |
| 14 (ad) | ∞ | 2.9220 | | |
| 15 | 6.3456 | 1.9725 | 1.67340 | 31.9 |
| 16 | −4.7108 | 0.2213 | 1.83500 | 44.5 |
| 17 | 21.1778 | 0.9606 | | |
| 18 | −106.3620 | 0.2213 | 1.83500 | 44.5 |
| 19 | 7.3012 | 1.9662 | 1.49700 | 81.6 |
| 20 | −5.0000 | 0.0443 | | |
| 21* | −7.5871 | 0.5531 | 1.49100 | 57.6 |
| 22* | −12.3982 | 0.0443 | | |
| 23 | 12.3751 | 2.0740 | 1.49700 | 81.6 |
| 24 | −3.5632 | 0.2323 | 1.83500 | 44.5 |
| 25 | 5.9369 | 1.8833 | 1.49700 | 81.6 |
| 26 | −11.4568 | 0.0664 | | |
| 27 | 16.0999 | 2.3778 | 1.49700 | 81.6 |
| 28 | −5.5821 | 5.0728 | | |
| 29 | ∞ | 8.4410 | 1.51680 | 64.2 |
| 30 | ∞ | | | |

| aspheric surface coefficient | | | | | |
|---|---|---|---|---|---|
| surface | K | $A_3$ | $A_4$ | $A_5$ | $A_6$ |
| 1 | 0.8000 | $-1.1860 \times 10^{-2}$ | $6.8932 \times 10^{-3}$ | $-5.6240 \times 10^{-4}$ | $-1.0116 \times 10^{-4}$ |
| 2 | −2.7978 | $-1.1595 \times 10^{-2}$ | $6.2040 \times 10^{-3}$ | $-4.9030 \times 10^{-4}$ | $-7.3030 \times 10^{-6}$ |
| 21 | 1.0000 | 0.0000 | $3.6770 \times 10^{-3}$ | 0.0000 | $8.9067 \times 10^{-5}$ |
| 22 | 1.0000 | 0.0000 | $3.6815 \times 10^{-3}$ | 0.0000 | $9.0950 \times 10^{-5}$ |

| surface | $A_7$ | $A_8$ | $A_9$ | $A_{10}$ | $A_{11}$ | $A_{12}$ |
|---|---|---|---|---|---|---|
| 1 | $2.1644 \times 10^{-5}$ | $-9.9524 \times 10^{-7}$ | $-7.6348 \times 10^{-8}$ | $8.9558 \times 10^{-9}$ | $-2.3282 \times 10^{-10}$ | $-2.9170 \times 10^{-13}$ |
| 2 | $-1.4019 \times 10^{-6}$ | $-8.2307 \times 10^{-7}$ | $1.2739 \times 10^{-7}$ | $4.7089 \times 10^{-9}$ | $-1.8133 \times 10^{-9}$ | $8.3399 \times 10^{-11}$ |
| 21 | 0.0000 | $-1.6329 \times 10^{-5}$ | 0.0000 | $1.3201 \times 10^{-6}$ | 0.0000 | 0.0000 |
| 22 | 0.0000 | $-1.5531 \times 10^{-5}$ | 0.0000 | $1.1864 \times 10^{-6}$ | 0.0000 | 0.0000 |

| | |
|---|---|
| Space from a conjugated position on the magnification side to the first surface of the projection lens device of the above data | 116.7 |

*aspheric surface
(ad: aperture diaphragm)

and $A_3$ to $A_{12}$ corresponding to the respective aspheric surfaces. The lowest portion of Table 8 shows a projection distance (a space from a conjugated position on the magnification side to the first surface of the lens device).

refractive power. The projection lens device is substantially telecentric on a reduction side thereof.

The first lens group $G_1$ includes, in order from the magnification side, a first lens $L_1$ formed of an aspheric lens having

TABLE 8

| surface | R | D | Nd | vd |
|---|---|---|---|---|
| 1* | −14.9479 | 1.5043 | 1.49100 | 57.6 |
| 2* | −143.5173 | 0.9019 | | |
| 3 | 14.8408 | 0.7414 | 1.81832 | 46.2 |
| 4 | 7.1727 | 1.9735 | | |
| 5 | 12.8489 | 0.6951 | 1.72853 | 55.1 |
| 6 | 5.3232 | 3.0547 | | |
| 7 | −21.9161 | 0.5792 | 1.73106 | 54.9 |
| 8 | 12.6237 | 0.8274 | | |
| 9 | −223.0992 | 0.4657 | 1.49700 | 81.6 |
| 10 | 6.8417 | 3.9390 | 1.72633 | 28.7 |
| 11 | −5.4829 | 0.4170 | 1.83500 | 24.3 |
| 12 | 766.9188 | 10.3171 | | |
| 13 | 118.0204 | 0.5890 | 1.83500 | 23.2 |
| 14 | −47.7368 | 9.3642 | | |
| 15 (mask) | ∞ | 3.7462 | | |
| 16 (ad) | ∞ | 4.1727 | | |
| 17 | 6.2028 | 1.7209 | 1.62876 | 35.1 |
| 18 | −3.3730 | 0.3939 | 1.83165 | 44.8 |
| 19 | 7.4541 | 2.2467 | 1.49700 | 81.6 |
| 20 | −4.1101 | 0.0463 | | |
| 21* | −5.7603 | 0.6896 | 1.49100 | 57.6 |
| 22* | −7.4208 | 0.0463 | | |
| 23 | 47.5111 | 1.3731 | 1.48749 | 70.2 |
| 24 | −4.0378 | 0.2433 | 1.83500 | 44.2 |
| 25 | 4.6530 | 1.4213 | 1.49700 | 81.6 |
| 26 | −29.0261 | 0.0693 | | |
| 27 | 9.9565 | 1.8847 | 1.49700 | 81.6 |
| 28 | −5.0192 | 1.4661 | | |
| 29 | ∞ | 5.5605 | 1.58913 | 61.1 |
| 30 | ∞ | 5.1551 | 1.51680 | 64.2 |
| 31 | ∞ | | | |

| | aspheric surface coefficient | | | | |
|---|---|---|---|---|---|
| surface | K | $A_3$ | $A_4$ | $A_5$ | $A_6$ |
| 1 | 0.8000 | $-1.2026 \times 10^{-2}$ | $6.1795 \times 10^{-3}$ | $-4.6454 \times 10^{-4}$ | $-8.0983 \times 10^{-5}$ |
| 2 | −2.7978 | $-1.2351 \times 10^{-2}$ | $5.4717 \times 10^{-3}$ | $-3.9816 \times 10^{-4}$ | $-5.2274 \times 10^{-6}$ |
| 21 | 1.0000 | $1.0284 \times 10^{-3}$ | $6.4218 \times 10^{-3}$ | $-3.4386 \times 10^{-4}$ | $2.2526 \times 10^{-4}$ |
| 22 | 1.0000 | $1.2902 \times 10^{-3}$ | $6.3164 \times 10^{-3}$ | $9.1654 \times 10^{-4}$ | $-1.9185 \times 10^{-4}$ |

| surface | $A_7$ | $A_8$ | $A_9$ | $A_{10}$ | $A_{11}$ | $A_{12}$ |
|---|---|---|---|---|---|---|
| 1 | $1.6384 \times 10^{-5}$ | $-7.1913 \times 10^{-7}$ | $-5.2512 \times 10^{-8}$ | $5.9154 \times 10^{-9}$ | $-1.5244 \times 10^{-10}$ | $2.2113 \times 10^{-13}$ |
| 2 | $-1.0954 \times 10^{-6}$ | $-4.9235 \times 10^{-7}$ | $1.1163 \times 10^{-7}$ | $3.6095 \times 10^{-9}$ | $-1.3941 \times 10^{-9}$ | $5.7875 \times 10^{-11}$ |
| 21 | $-6.5310 \times 10^{-7}$ | $-4.1874 \times 10^{-5}$ | $-1.4716 \times 10^{-6}$ | $2.2435 \times 10^{-6}$ | 0.0000 | 0.0000 |
| 22 | $2.0473 \times 10^{-6}$ | $-1.2633 \times 10^{-7}$ | $2.3841 \times 10^{-6}$ | $-9.6755 \times 10^{-7}$ | 0.0000 | 0.0000 |

| Space from a conjugated position on the magnification side to the first surface of the projection lens device of the above data | 117.3 |
|---|---|

*aspheric surface
(ad: aperture diaphragm)

The values of Example 8 corresponding to the conditional expressions (1) to (7) are shown in Table 13 (which will be described later), and satisfy the conditional expressions (1) to (7) (the values also satisfy conditional expressions (1') and (5')).

EXAMPLE 9

Figure 13:
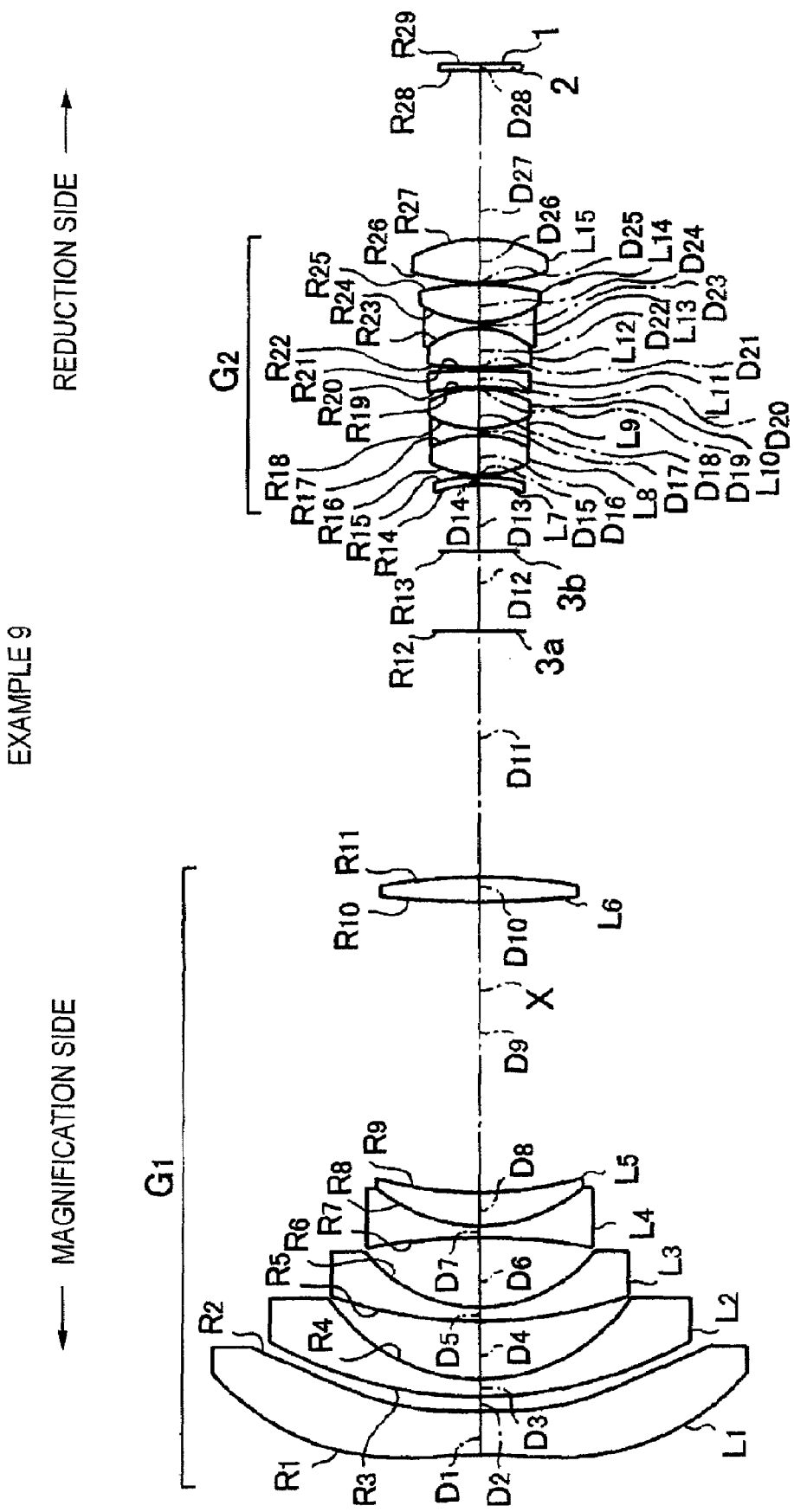
FIG. 13 is a diagram illustrating the configuration of a projection lens device according to Example 9 of the invention.

The configuration of a projection lens device according to Example 9 is shown in FIG. 13. The projection lens device according to Example 9 includes, in order from a magnification side, a first lens group $G_1$, a mask 3a, an aperture diaphragm 3b, and a second lens group $G_2$ having a positive a low refractive power, a second lens $L_2$ and a third lens $L_3$ which are formed of negative meniscus lenses having concave surfaces directed to the reduction side, a two-element cemented lens formed by cementing a fourth lens $L_4$ formed of a biconcave lens and a fifth lens $L_5$ formed of a positive meniscus lens having a convex surface directed to the magnification side, and a sixth lens $L_6$ formed of a biconvex lens.

On the other hand, the second lens group $G_2$ includes, in order from the magnification side, a seventh lens $L_7$ formed of a meniscus lens which has a low refractive power and which has a convex surface directed to the reduction side, a three-element cemented lens formed by sandwiching a ninth lens $L_9$ formed of a biconcave lens between an eighth lens $L_8$ and a tenth lens $L_{10}$ which are formed of positive lenses, an eleventh lens $L_{11}$ formed of an aspheric lens having a convex surface directed to the reduction side, a three-element cemented lens formed by sandwiching a thirteenth lens $L_{13}$ formed of a biconcave lens between a twelfth lens $L_{12}$ and a fourteenth lens $L_{14}$ which are formed of positive lenses, and a fifteenth lens $L_{15}$ formed of a biconvex lens.

The upper portion of Table 9 shows R which is a radius of curvature of each lens surface in the projection lens device according to the Example 9, D which is an on-axis surface space of each lens, $N_d$ which is a refractive index of each lens at d-line, and $v_d$ which is an Abbe number of each lens at the d-line. Also, the lower portion of Table 9 shows constants K and $A_3$ to $A_{12}$ corresponding to the respective aspheric surfaces. The lowest portion of Table 9 shows a projection distance (a space from a conjugated position on the magnification side to the first surface of the lens device).

The values of Example 9 corresponding to the conditional expressions (1) to (7) are shown in Table 13 (which will be described later), and satisfy the conditional expressions (1) to (7) (the values also satisfy conditional expressions (1') and (5')).

EXAMPLE 10

Figure 14:
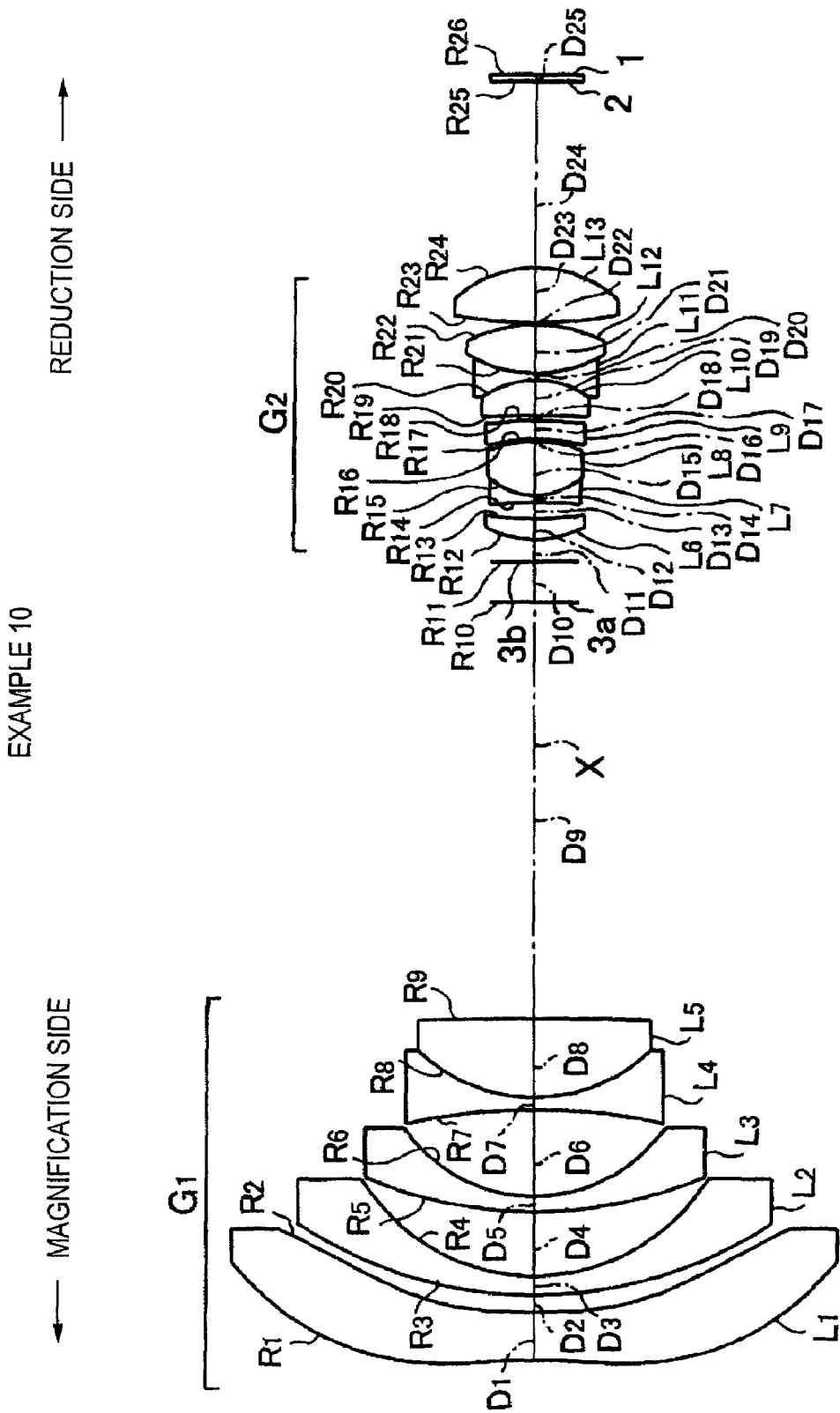
FIG. 14 is a diagram illustrating the configuration of a projection lens device according to Example 10 of the invention.

The configuration of a projection lens device according to Example 10 is shown in FIG. 14, and is substantially similar to the configuration of the projection lens device according to Example 1.

The upper portion of Table 10 shows R which is a radius of curvature of each lens surface in the projection lens device according to the Example 10, D which is an on-axis surface space of each lens, $N_d$ which is a refractive index of each lens at d-line, and $v_d$ which is an Abbe number of each lens at the

TABLE 9

| surface | R | D | Nd | vd |
|---|---|---|---|---|
| 1* | −17.3733 | 1.7026 | 1.49100 | 57.6 |
| 2* | 73.5863 | 0.5842 | | |
| 3 | 17.2813 | 0.6810 | 1.72657 | 55.2 |
| 4 | 7.3851 | 2.2682 | | |
| 5 | 18.4189 | 0.5351 | 1.75000 | 53.0 |
| 6 | 5.9519 | 2.7435 | | |
| 7 | −26.4853 | 0.4378 | 1.80000 | 48.0 |
| 8 | 6.4624 | 1.3149 | 1.64507 | 33.9 |
| 9 | 15.5706 | 11.4510 | | |
| 10 | 36.5447 | 0.9897 | 1.65724 | 33.1 |
| 11 | −23.2883 | 9.7291 | | |
| 12 (mask) | ∞ | 3.1620 | | |
| 13 (ad) | ∞ | 2.6245 | | |
| 14 | −5.2141 | 0.2919 | 1.80000 | 48.0 |
| 15 | −8.0116 | 0.0730 | | |
| 16 | 4.3639 | 1.5641 | 1.60172 | 37.8 |
| 17 | −4.3433 | 0.2432 | 1.80000 | 48.0 |
| 18 | 4.3433 | 1.5796 | 1.49700 | 81.6 |
| 19 | −4.4504 | 0.0730 | | |
| 20* | −8.6169 | 0.6567 | 1.51007 | 56.2 |
| 21* | −14.7260 | 0.0730 | | |
| 22 | 12.3332 | 1.5806 | 1.49000 | 65.4 |
| 23 | −3.4258 | 0.2432 | 1.80000 | 43.4 |
| 24 | 4.3433 | 1.5084 | 1.49700 | 81.6 |
| 25 | −10.6556 | 0.0730 | | |
| 26 | 8.6473 | 1.7195 | 1.49700 | 81.6 |
| 27 | −5.7003 | 6.5915 | | |
| 28 | ∞ | 0.2554 | 1.51680 | 64.2 |
| 29 | ∞ | | | | aspheric surface coefficient

| surface | K | $A_3$ | $A_4$ | $A_5$ | $A_6$ |
|---|---|---|---|---|---|
| 1 | 0.8000 | $1.3776 \times 10^{-3}$ | $2.2566 \times 10^{-3}$ | $-1.9726 \times 10^{-4}$ | $-5.5056 \times 10^{-5}$ |
| 2 | −2.7978 | $2.2315 \times 10^{-3}$ | $1.7317 \times 10^{-3}$ | $-3.0380 \times 10^{-4}$ | $1.6022 \times 10^{-5}$ |
| 20 | 1.0000 | 0.0000 | $3.1500 \times 10^{-3}$ | $-1.4734 \times 10^{-3}$ | $4.4925 \times 10^{-4}$ |
| 21 | 1.0000 | 0.0000 | $4.8895 \times 10^{-3}$ | $-3.5057 \times 10^{-3}$ | $3.5894 \times 10^{-3}$ |

| surface | $A_7$ | $A_8$ | $A_9$ | $A_{10}$ | $A_{11}$ | $A_{12}$ |
|---|---|---|---|---|---|---|
| 1 | $1.2228 \times 10^{-5}$ | $-6.1995 \times 10^{-7}$ | $-4.0983 \times 10^{-8}$ | $4.4729 \times 10^{-9}$ | $-2.6928 \times 10^{-11}$ | $-4.8228 \times 10^{-12}$ |
| 2 | $7.5890 \times 10^{-8}$ | $-4.5472 \times 10^{-7}$ | $6.4476 \times 10^{-8}$ | $2.1910 \times 10^{-9}$ | $-7.7418 \times 10^{-10}$ | $3.2799 \times 10^{-11}$ |
| 20 | $5.4372 \times 10^{-4}$ | $-4.7357 \times 10^{-4}$ | $1.2263 \times 10^{-4}$ | $-8.4044 \times 10^{-6}$ | 0.0000 | 0.0000 |
| 21 | $-1.6360 \times 10^{-3}$ | $2.4538 \times 10^{-4}$ | $4.3317 \times 10^{-5}$ | $-1.3315 \times 10^{-5}$ | 0.0000 | 0.0000 |

| Space from a conjugated position on the magnification side to the first surface of the projection lens device of the above data | 153.2 |
|---|---|

*aspheric surface
(ad: aperture diaphragm)

d-line. Also, the lower portion of Table 10 shows constants K and $A_3$ to $A_{12}$ corresponding to the respective aspheric surfaces. The lowest portion of Table 10 shows a projection distance (a space from a conjugated position on the magnification side to the first surface of the lens device).

of Example 9 except that a fourth lens $L_4$ to a sixth lens $L_6$ constitute a three-element cemented lens formed by sandwiching the fifth lens $L_5$ formed of a biconvex lens between the fourth lens $L_4$ and the sixth lens $L_6$ which are formed of negative lenses.

TABLE 10

| surface | R | D | Nd | νd |
|---|---|---|---|---|
| 1* | −17.4036 | 1.7046 | 1.49100 | 57.6 |
| 2* | 42.3622 | 0.6088 | | |
| 3 | 15.8305 | 0.6818 | 1.72933 | 55.0 |
| 4 | 7.4788 | 2.2650 | | |
| 5 | 16.0476 | 0.5357 | 1.74706 | 53.3 |
| 6 | 5.8131 | 3.0564 | | |
| 7 | −22.3206 | 0.4383 | 1.80000 | 48.0 |
| 8 | 6.1448 | 2.8154 | 1.63000 | 35.0 |
| 9 | −156.3600 | 14.8623 | | |
| 10 (mask) | ∞ | 1.4611 | | |
| 11 (ad) | ∞ | 0.7884 | | |
| 12 | 3.6638 | 0.7440 | 1.84666 | 23.8 |
| 13 | 11.2312 | 0.5938 | | |
| 14 | −19.4262 | 0.2435 | 1.80400 | 46.6 |
| 15 | 2.4444 | 1.9340 | 1.49700 | 81.6 |
| 16 | −4.3640 | 0.0848 | | |
| 17* | −5.3607 | 0.6575 | 1.51007 | 56.2 |
| 18* | −7.1356 | 0.1810 | | |
| 19 | −35.4288 | 1.2308 | 1.48749 | 70.2 |
| 20 | −3.4104 | 0.2435 | 1.80610 | 33.3 |
| 21 | 4.8418 | 1.7325 | 1.49700 | 81.6 |
| 22 | −5.4376 | 0.0731 | | |
| 23 | 16.3831 | 1.9634 | 1.49700 | 81.6 |
| 24 | −4.4049 | 6.5991 | | |
| 25 | ∞ | 0.2557 | 1.51680 | 64.2 |
| 26 | ∞ | | | |

| aspheric surface coefficient | | | | | |
|---|---|---|---|---|---|
| surface | K | $A_3$ | $A_4$ | $A_5$ | $A_6$ |
| 1 | 0.8000 | $7.7928 \times 10^{-4}$ | $2.3556 \times 10^{-3}$ | $-2.0271 \times 10^{-4}$ | $-5.5075 \times 10^{-5}$ |
| 2 | −2.7978 | $1.3029 \times 10^{-3}$ | $1.8275 \times 10^{-3}$ | $-2.9591 \times 10^{-4}$ | $1.5980 \times 10^{-5}$ |
| 19 | 1.0000 | 0.0000 | $7.5774 \times 10^{-3}$ | $-2.3579 \times 10^{-3}$ | $1.5868 \times 10^{-3}$ |
| 20 | 1.0000 | 0.0000 | $9.3620 \times 10^{-3}$ | $-8.6489 \times 10^{-4}$ | $2.7134 \times 10^{-3}$ |

| surface | $A_7$ | $A_8$ | $A_9$ | $A_{10}$ | $A_{11}$ | $A_{12}$ |
|---|---|---|---|---|---|---|
| 1 | $1.2166 \times 10^{-5}$ | $-6.1211 \times 10^{-7}$ | $-4.0497 \times 10^{-8}$ | $4.4220 \times 10^{-9}$ | $-2.7481 \times 10^{-11}$ | $-4.8156 \times 10^{-12}$ |
| 2 | $3.5869 \times 10^{-8}$ | $-4.5605 \times 10^{-7}$ | $6.3546 \times 10^{-8}$ | $2.1570 \times 10^{-9}$ | $-7.6402 \times 10^{-10}$ | $3.2732 \times 10^{-11}$ |
| 19 | $7.4348 \times 10^{-4}$ | $-5.1175 \times 10^{-4}$ | $1.1326 \times 10^{-4}$ | $-3.7665 \times 10^{-6}$ | 0.0000 | 0.0000 |
| 20 | $-1.5879 \times 10^{-3}$ | $4.8444 \times 10^{-4}$ | $1.2481 \times 10^{-4}$ | $-6.6366 \times 10^{-5}$ | 0.0000 | 0.0000 |

| Space from a conjugated position on the magnification side to the first surface of the projection lens device of the above data | 153.1 |
|---|---|

*aspheric surface
(ad: aperture diaphragm)

The values of Example 10 corresponding to the conditional expressions (1) to (7) are shown in Table 13 (which will be described later), and satisfy the conditional expressions (1) to (7) (the values also satisfy conditional expressions (1') and (5')).

EXAMPLE 11

Figure 15:
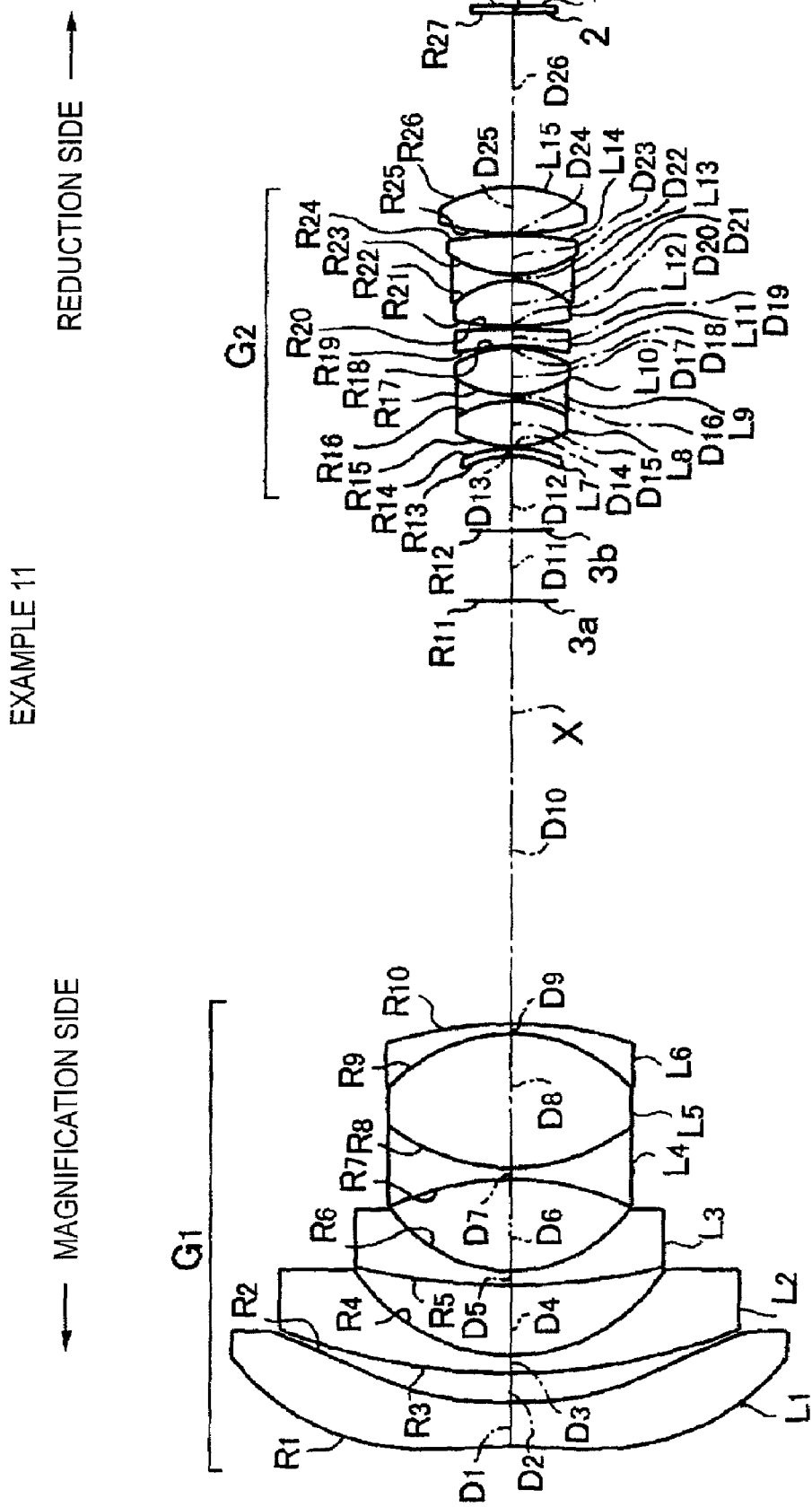
FIG. 15 is a diagram illustrating the configuration of a projection lens device according to Example 11 of the invention.

The configuration of a projection lens device according to Example 11 is shown in FIG. 15, and is substantially similar to the configuration of the projection lens device according to Example 9 shown in FIG. 13. Specifically, the configuration of the projection lens device of Example 11 is the same as that The upper portion of Table 11 shows R which is a radius of curvature of each lens surface in the projection lens device according to the Example 11, D which is an on-axis surface space of each lens, $N_d$ which is a refractive index of each lens at d-line, and $\nu_d$ which is an Abbe number of each lens at the d-line. Also, the lower portion of Table 11 shows constants K and $A_3$ to $A_{12}$ corresponding to the respective aspheric surfaces. The lowest portion of Table 11 shows a projection distance (a space from a conjugated position on the magnification side to the first surface of the lens device).

TABLE 11

| surface | R | D | Nd | νd |
|---|---|---|---|---|
| 1* | −17.4162 | 1.7034 | 1.49100 | 57.6 |
| 2* | 37.9557 | 1.0950 | | |
| 3 | 24.1854 | 0.6814 | 1.75000 | 53.0 |
| 4 | 7.1878 | 2.6547 | | |
| 5 | 26.3292 | 0.5354 | 1.75000 | 53.0 |
| 6 | 5.7731 | 3.4424 | | |
| 7 | −11.2714 | 0.4380 | 1.59292 | 61.4 |
| 8 | 7.8123 | 5.0928 | 1.70127 | 29.9 |
| 9 | −6.4037 | 0.3772 | 1.80001 | 25.0 |
| 10 | −15.7842 | 16.1215 | | |
| 11 (mask) | ∞ | 2.6768 | | |
| 12 (ad) | ∞ | 2.8609 | | |
| 13 | −4.1437 | 0.2920 | 1.68901 | 57.0 |
| 14 | −5.1274 | 0.0730 | | |
| 15 | 4.6287 | 1.7266 | 1.61521 | 36.5 |
| 16 | −4.3454 | 0.2433 | 1.80400 | 46.6 |
| 17 | 4.3454 | 1.7781 | 1.49700 | 81.6 |
| 18 | −4.3697 | 0.0730 | | |
| 19* | −8.6698 | 0.6570 | 1.51007 | 56.2 |
| 20* | −14.9828 | 0.0730 | | |
| 21 | 10.9545 | 1.7243 | 1.49521 | 65.2 |
| 22 | −3.4274 | 0.2433 | 1.79999 | 43.4 |
| 23 | 4.4042 | 1.4761 | 1.49700 | 81.6 |
| 24 | −16.7293 | 0.0730 | | |
| 25 | 9.6024 | 1.7980 | 1.49700 | 81.6 |
| 26 | −5.3697 | 6.5946 | | |
| 27 | ∞ | 0.2555 | 1.51680 | 64.2 |
| 28 | ∞ | | | | aspheric surface coefficient

| surface | K | $A_3$ | $A_4$ | $A_5$ | $A_6$ |
|---|---|---|---|---|---|
| 1 | 0.8000 | $1.7239 \times 10^{-3}$ | $2.1611 \times 10^{-3}$ | $-1.9350 \times 10^{-4}$ | $-5.4588 \times 10^{-5}$ |
| 2 | −2.7978 | $2.0817 \times 10^{-3}$ | $1.7208 \times 10^{-3}$ | $-3.0475 \times 10^{-4}$ | $1.5836 \times 10^{-5}$ |
| 19 | 1.0000 | 0.0000 | $3.1361 \times 10^{-3}$ | $-1.5439 \times 10^{-3}$ | $4.0962 \times 10^{-4}$ |
| 20 | 1.0000 | 0.0000 | $4.6555 \times 10^{-3}$ | $-3.5912 \times 10^{-3}$ | $3.5920 \times 10^{-3}$ |

| surface | $A_7$ | $A_8$ | $A_9$ | $A_{10}$ | $A_{11}$ | $A_{12}$ |
|---|---|---|---|---|---|---|
| 1 | $1.2204 \times 10^{-5}$ | $-6.1808 \times 10^{-7}$ | $-4.0878 \times 10^{-8}$ | $4.4501 \times 10^{-9}$ | $-2.6940 \times 10^{-11}$ | $-4.7943 \times 10^{-12}$ |
| 2 | $6.6304 \times 10^{-8}$ | $-4.5356 \times 10^{-7}$ | $6.4240 \times 10^{-8}$ | $2.1858 \times 10^{-9}$ | $-7.6997 \times 10^{-10}$ | $3.2688 \times 10^{-11}$ |
| 19 | $5.4306 \times 10^{-4}$ | $-4.7113 \times 10^{-4}$ | $1.2148 \times 10^{-4}$ | $-9.0366 \times 10^{-6}$ | 0.0000 | 0.0000 |
| 20 | $-1.6411 \times 10^{-3}$ | $2.3972 \times 10^{-4}$ | $4.1977 \times 10^{-5}$ | $-1.3267 \times 10^{-5}$ | 0.0000 | 0.0000 |

| | |
|---|---|
| Space from a conjugated position on the magnification side to the first surface of the projection lens device of the above data | 153.2 |

*aspheric surface
(ad: aperture diaphragm)

The values of Example 11 corresponding to the conditional expressions (1) to (7) are shown in Table 13 (which will be described later), and satisfy the conditional expressions (1) to (7) (the values also satisfy conditional expressions (1') and (5')).

EXAMPLE 12

Figure 16:
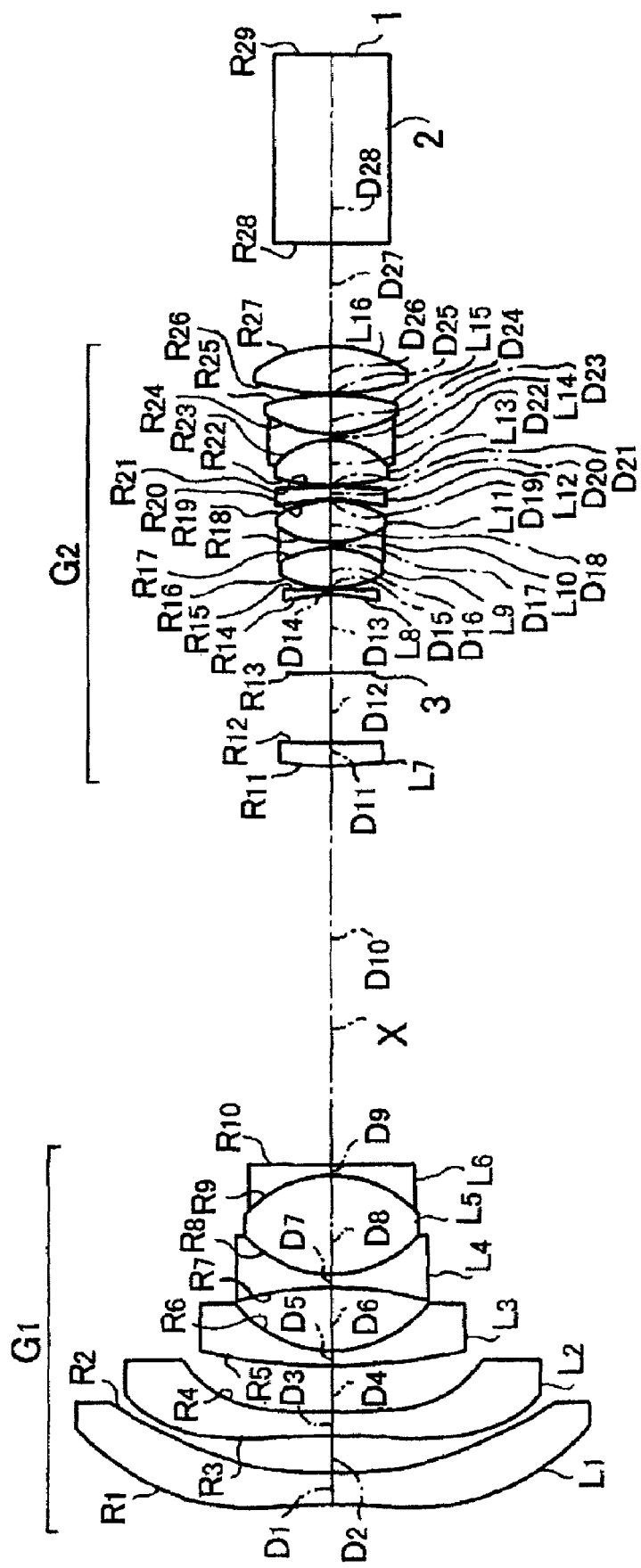
FIG. 16 is a diagram illustrating the configuration of a projection lens device according to Example 12 of the invention.
Figure 23:
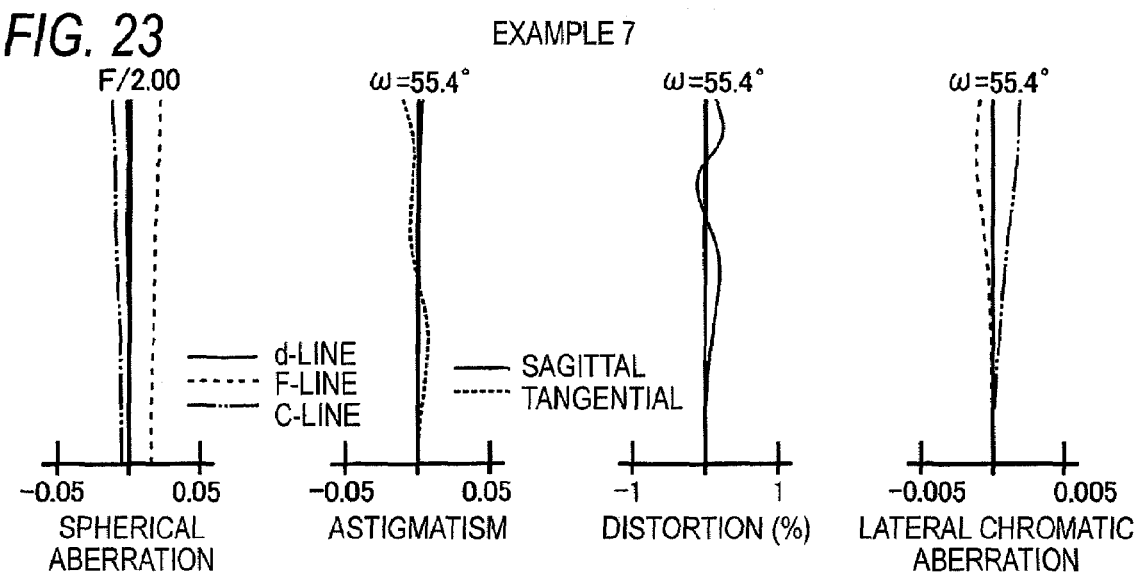
FIG. 23 is a diagram illustrating various aberrations of the projection lens device according to Example 7.
Figure 24:
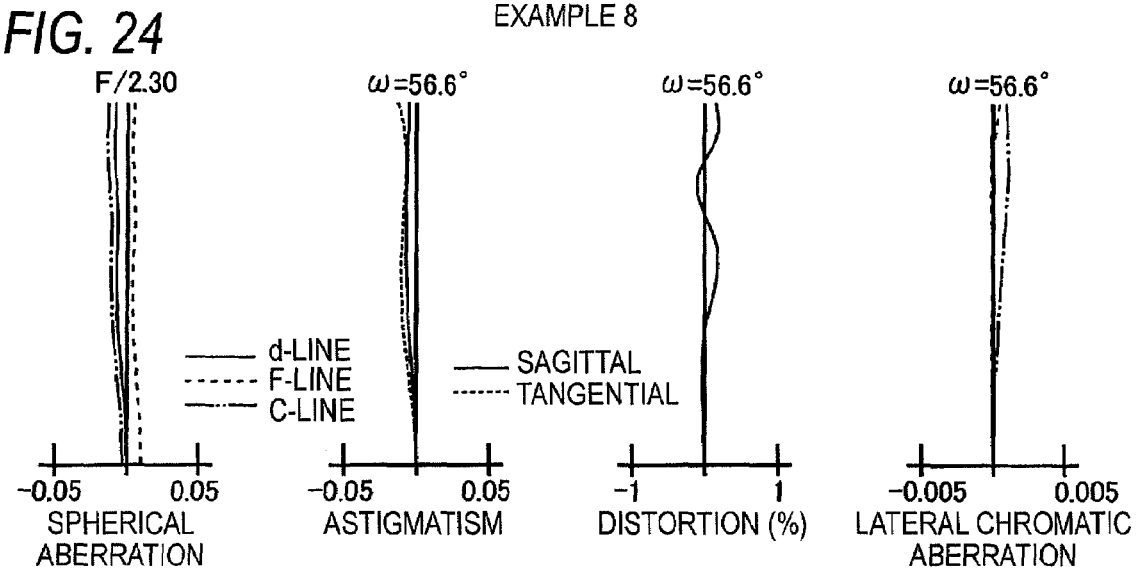
FIG. 24 is a diagram illustrating various aberrations of the projection lens device according to Example 8.
Figure 25:
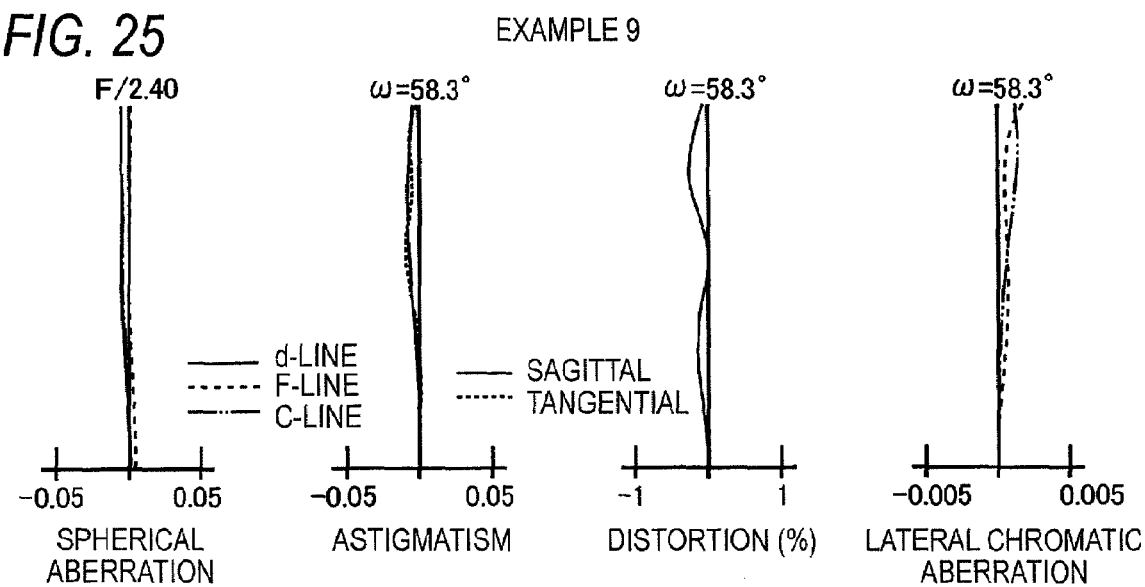
FIG. 25 is a diagram illustrating various aberrations of the projection lens device according to Example 9.

The configuration of a projection lens device according to Example 12 is shown in FIG. 16. The projection lens device has substantially similar configuration to the projection lens device according to Example 6 shown in FIG. 10.

The upper portion of Table 12 shows R which is a radius of curvature of each lens surface in the projection lens device according to the Example 12, D which is an on-axis surface space of each lens, $N_d$ which is a refractive index of each lens at d-line, and $\nu_d$ which is an Abbe number of each lens at the d-line. Also, the lower portion of Table 12 shows constants K and $A_3$ to $A_{12}$ corresponding to the respective aspheric surfaces. The lowest portion of Table 12 shows a projection distance (a space from a conjugated position on the magnification side to the first surface of the lens device).

TABLE 12

| surface | R | D | Nd | νd |
|---|---|---|---|---|
| 1* | −12.5126 | 1.1673 | 1.49100 | 57.6 |
| 2* | 42.1144 | 1.3938 | | |
| 3* | −27.3283 | 0.8886 | 1.49100 | 57.6 |

TABLE 12-continued

| | | | | |
|---|---|---|---|---|
| 4* | 193.4947 | 1.7157 | | |
| 5 | 22.1926 | 0.5575 | 1.79516 | 48.5 |
| 6 | 4.6686 | 2.3604 | | |
| 7 | −12.9856 | 0.4704 | 1.65866 | 58.6 |
| 8 | 4.4421 | 3.6537 | 1.71028 | 29.5 |
| 9 | −4.4421 | 0.3920 | 1.83499 | 23.3 |
| 10 | 234.6581 | 14.9430 | | |
| 11 | 14.6919 | 0.8576 | 1.84666 | 23.8 |
| 12 | 231.6613 | 2.6134 | | |
| 13 (ad) | ∞ | 2.9419 | | |
| 14 | −6.8793 | 0.2091 | 1.79627 | 48.4 |
| 15 | −83.2960 | 0.0607 | | |
| 16 | 4.2134 | 1.4901 | 1.61636 | 36.4 |
| 17 | −3.6409 | 0.2091 | 1.79999 | 48.0 |
| 18 | 3.9031 | 1.5754 | 1.49700 | 81.6 |
| 19 | −3.9031 | 0.0523 | | |
| 20* | −6.8795 | 0.4705 | 1.51007 | 56.2 |
| 21* | −14.5104 | 0.0533 | | |
| 22 | 8.7287 | 1.6983 | 1.49700 | 81.6 |
| 23 | −2.8562 | 0.2265 | 1.80000 | 45.1 |
| 24 | 4.6797 | 1.4380 | 1.48749 | 70.2 |
| 25 | −9.1852 | 0.0523 | | |
| 26 | 10.0640 | 1.7419 | 1.49700 | 81.6 |
| 27 | −5.0926 | 3.8504 | | |
| 28 | ∞ | 7.0214 | 1.51680 | 64.2 |
| 29 | ∞ | | | |

| aspheric surface coefficient | | | | | |
|---|---|---|---|---|---|
| surface | K | $A_3$ | $A_4$ | $A_5$ | $A_6$ |
| 1 | 0.8000 | $3.0220 \times 10^{-3}$ | $2.9115 \times 10^{-3}$ | $-2.8024 \times 10^{-4}$ | $-7.5767 \times 10^{-5}$ |
| 2 | −2.7978 | $2.4579 \times 10^{-3}$ | $1.9516 \times 10^{-3}$ | $-3.8784 \times 10^{-4}$ | $2.2987 \times 10^{-5}$ |
| 3 | 1.0000 | 0.0000 | $8.5666 \times 10^{-4}$ | 0.0000 | $-1.6275 \times 10^{-6}$ |
| 4 | 1.0000 | 0.0000 | $2.1021 \times 10^{-3}$ | 0.0000 | $-4.4386 \times 10^{-5}$ |
| 20 | 1.0000 | 0.0000 | $4.4614 \times 10^{-3}$ | $-2.0676 \times 10^{-3}$ | $6.0634 \times 10^{-4}$ |
| 21 | 1.0000 | 0.0000 | $5.8016 \times 10^{-3}$ | $-4.8000 \times 10^{-3}$ | $4.8221 \times 10^{-3}$ |

| surface | $A_7$ | $A_8$ | $A_9$ | $A_{10}$ | $A_{11}$ | $A_{12}$ |
|---|---|---|---|---|---|---|
| 1 | $1.8215 \times 10^{-5}$ | $-9.8768 \times 10^{-7}$ | $-7.0270 \times 10^{-8}$ | $8.0884 \times 10^{-9}$ | $-4.0506 \times 10^{-11}$ | $-1.0257 \times 10^{-11}$ |
| 2 | $1.8277 \times 10^{-7}$ | $-7.1215 \times 10^{-7}$ | $1.0980 \times 10^{-7}$ | $3.9677 \times 10^{-9}$ | $-1.5013 \times 10^{-9}$ | $6.6263 \times 10^{-11}$ |
| 3 | 0.0000 | $-7.4709 \times 10^{-8}$ | 0.0000 | $1.0756 \times 10^{-9}$ | 0.0000 | 0.0000 |
| 4 | 0.0000 | $1.7894 \times 10^{-6}$ | 0.0000 | $-1.9742 \times 10^{-8}$ | 0.0000 | 0.0000 |
| 20 | $8.0381 \times 10^{-4}$ | $-7.4068 \times 10^{-4}$ | $2.0879 \times 10^{-4}$ | $-1.3576 \times 10^{-5}$ | 0.0000 | 0.0000 |
| 21 | $-2.3864 \times 10^{-3}$ | $3.9535 \times 10^{-4}$ | $7.0240 \times 10^{-5}$ | $-2.4608 \times 10^{-5}$ | 0.0000 | 0.0000 |

| | |
|---|---|
| Space from a conjugated position on the magnification side to the first surface of the projection lens device of the above data | 89.7 |

*aspheric surface
(ad: aperture diaphragm)

The values of Example 12 corresponding to the conditional expressions (1) to (7) are shown in Table 13 (which will be described later), and satisfy the conditional expressions (1) to (7) (the values also satisfy conditional expressions (1') and (5')).

TABLE 13

| | Cond. Exp. (1), (1') | Cond. Exp. (2) | Cond. Exp. (3) | Cond. Exp. (4) | Cond. Exp. (5), (5') | Cond. Exp. (6) | Cond. Exp. (7) | Cond. Exp. (8) |
|---|---|---|---|---|---|---|---|---|
| Example 1 | 6.76 | 116.6 | 17.7 | −3.2 | 8.0 | 10.0 | 40.7 | 17.7 |
| Example 2 | 7.85 | 112.3 | 19.5 | −4.6 | 9.4 | 4.7 | 28.0 | |
| Example 3 | 7.79 | 112.3 | 22.3 | −3.3 | 11.8 | 5.2 | 30.1 | 22.3 |
| Example 4 | 8.38 | 112.2 | 15.9 | −2.8 | 10.0 | 4.9 | 31.1 | 15.9 |
| Example 5 | 8.50 | 112.1 | 13.9 | −5.1 | 8.5 | 3.9 | 32.8 | 7.0 |
| Example 6 | 8.50 | 111.9 | 15.5 | −2.6 | 10.5 | 4.1 | 29.5 | |
| Example 7 | 10.64 | 110.9 | 19.1 | −2.6 | 10.5 | 4.5 | 33.6 | |
| Example 8 | 8.36 | 113.3 | 17.3 | −5.4 | 9.4 | 4.8 | 28.7 | |
| Example 9 | 6.77 | 116.6 | 15.5 | −12.3 | 7.9 | 16.2 | 33.9 | |
| Example 10 | 6.75 | 116.6 | 17.1 | −3.2 | 7.8 | 9.4 | 35.0 | |

TABLE 13-continued

|  | Cond. Exp. (1), (1') | Cond. Exp. (2) | Cond. Exp. (3) | Cond. Exp. (4) | Cond. Exp. (5), (5') | Cond. Exp. (6) | Cond. Exp. (7) | Cond. Exp. (8) |
|---|---|---|---|---|---|---|---|---|
| Example 11 | 6.76 | 116.7 | 21.7 | −4.4 | 8.0 | 5.9 | 29.9 | |
| Example 12 | 8.48 | 111.8 | 14.9 | −2.5 | 10.7 | 3.8 | 29.5 | |

Also, FIGS. 17 to 28 are aberration diagrams illustrating various aberrations (spherical aberration, astigmatism, distortion, and lateral chromatic aberration) of the projection lens devices according to Examples 1 to 12. In the aberration diagrams, ω represents a half angle of view. In the aberration diagrams of the spherical aberration, aberration curves at a d-line, an F-line, and a C-line are illustrated. In the aberration diagrams of lateral chromatic aberration, aberration curves at the F-line and the C-line with respect to the d-line are illustrated. As shown in FIGS. 17 to 28, in the projection lens device according to Examples 1 to 12, not only distortion and chromatic aberration but also the other aberrations are well corrected. Thus, the projection lens device has the following characteristics: a half angle of view being in the range of 55.4 to 58.3° (see the numerical values corresponding to the conditional expression (2) in Table 13), F number being in the range of 2.00 to 2.5°, which indicate a wide angle and high brightness. In addition, the projection lens device secures the followings: a sufficient back focal length (see the numerical values corresponding to the same conditional expression (1)), and an air space (see the numerical values corresponding to the same conditional expression (3)) between lenses that is sufficient to insert the reflection mirror.

Also, the projection lens device according to the invention is not limited to the examples mentioned above, and may be modified in various ways. For example, it may be possible to properly modify radiuses of curvature R of the lenses and inter-lens spaces D (or lens thicknesses).

Also, the projection display apparatus according to the invention is not limited to the configurations mentioned above, and may be modified to constitute various apparatus having the projection lens device according to the invention. As the light valve, it may be possible to use a transmissive or reflective liquid crystal display device, or a micro mirror element (for example, a digital micro mirror device manufactured by Texas Instruments Co.) in which a plurality of inclinable micro mirrors are formed on a substantially flat surface. As the illumination optical section, it may be possible to employ a proper configuration corresponding to types of the light valves.

What is claimed is:

1. A projection lens device comprising, in order from a magnification side:
   a first lens group having a negative refractive power; and
   a second lens group having a positive refractive power,
   wherein
   a space between the first lens group and the second lens group is set as the maximum air space in the projection lens device,
   the projection lens device is substantially telecentric on a reduction side thereof,
   the first lens group has at least one aspheric surface, and
   the projection lens device satisfies the following conditional expressions (1) to (5)

$$5.0 < Bf/f \quad (1)$$

$$105° < 2\omega \quad (2)$$

$$5.0 < d/f \quad (3)$$

$$-15.0 < f1/f < -1.0 \quad (4)$$

$$5.7 < f2/f \quad (5),$$

where
   f denotes a focal length of the whole system,
   Bf denotes an air equivalent length of a back focal length of the whole system,
   2ω denotes a field angle on the magnification side,
   d denotes the maximum air space,
   f1 denotes a focal length of the first lens group, and
   f2 denotes a focal length of the second lens group.

2. The projection lens device according to claim 1, wherein
   a three-element cemented lens formed by cementing three lenses is disposed in the second lens group, and
   two or more positive lenses made of a material having an Abbe number of 75 or more are disposed in the second lens group.

3. The projection lens device according to claim 1, wherein
   in one of the maximum air space and air spaces in the second lens group, a magnification-side focal point of a lens group disposed on the reduction side of the one air space exists, and
   a lens surface adjacent to the reduction side of the magnification-side focal point is formed into a concave surface.

4. The projection lens device according to claim 1, wherein at least one positive lens that satisfies the following conditional expressions (6) and (7) is disposed in the first lens group:

$$2.5 < fp/f < 25.0 \quad (6)$$

$$45 > vdp \quad (7),$$

where
   fp denotes a focal length of the positive lens in the first lens group, and
   vdp denotes an Abbe number of the positive lens in the first lens group.

5. The projection lens device according to claim 1, wherein an optical path of the system is deflected by inserting a reflection mirror in an air space that satisfies the following conditional expression (8):

$$6.0 < ld/f \quad (8),$$

where
   ld denotes the air space in which the reflection mirror is disposed.

6. The projection lens device according to claim 1, wherein at least one lens of the second lens group has at least one aspheric surface.

7. The projection lens device according to claim 1, wherein a three-element cemented lens that is formed by sandwiching a positive lens between two negative lenses is disposed in the first lens group.

8. The projection lens device according to claim 1, wherein
a lens, on the most-magnification side, of the first lens group and an optional lens of the second lens group are aspheric lenses, and
correction of an image surface curvature associated with variation in projection distance is performed by moving the lens, on the most-magnification side, of the first lens group in an optical axis direction.

9. The projection lens device according to claim 1, wherein correction of a position of an image place associated with variation in projection distance is performed by varying the air space between the first lens group and the second lens.

10. A projection display apparatus comprising:
at least one light source;
at least one light valve;
at least one illumination optical section that guides a beam emitted from the at least one light source, to the at least one light valve; and
the projection lens device according to claim 1, wherein
the beam emitted from the at least one light source is optically modulated by the at least one light valve and is projected onto a screen by the projection lens device.

* * * * *